United States Patent
Charbonneau

(10) Patent No.: US 9,096,453 B2
(45) Date of Patent: Aug. 4, 2015

(54) SUBMERGED COMBUSTION MELTING PROCESSES FOR PRODUCING GLASS AND SIMILAR MATERIALS, AND SYSTEMS FOR CARRYING OUT SUCH PROCESSES

(75) Inventor: Mark William Charbonneau, Lakewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/493,219

(22) Filed: Jun. 11, 2012

(65) Prior Publication Data

US 2013/0327092 A1    Dec. 12, 2013

(51) Int. Cl.
C03B 5/24     (2006.01)
C03B 5/04     (2006.01)
C03B 5/167    (2006.01)
C03B 5/20     (2006.01)
C03B 5/235    (2006.01)
C03B 5/44     (2006.01)
C03B 7/06     (2006.01)
C03B 3/02     (2006.01)

(52) U.S. Cl.
CPC . *C03B 5/04* (2013.01); *C03B 3/023* (2013.01); *C03B 5/167* (2013.01); *C03B 5/205* (2013.01); *C03B 5/2356* (2013.01); *C03B 5/24* (2013.01); *C03B 5/44* (2013.01); *C03B 7/06* (2013.01); *C03B 2211/22* (2013.01); *C03B 2211/70* (2013.01)

(58) Field of Classification Search
CPC .... C03B 5/2356; C03B 5/44; C03B 2211/70; C03B 2211/71; C03B 5/20; C03B 5/202; C03B 5/205; C03B 5/04; C03B 5/167; C03B 5/24

USPC ...................................... 65/29.19, 29.21, 162
See application file for complete search history.

(56) References Cited

U.S. PATENT DOCUMENTS 2,174,533 A   10/1939   See et al.
2,432,942 A   12/1947   See et al.
(Continued)

FOREIGN PATENT DOCUMENTS

KR    2000 0050572 A    8/2000

OTHER PUBLICATIONS

"AccuTru Temperature Measurement", AccuTru International Corporation, 2003.
(Continued)

*Primary Examiner* — Jason L Lazorcik
(74) *Attorney, Agent, or Firm* — Robert D. Touslee

(57) ABSTRACT

Processes of controlling submerged combustion melters, and systems for carrying out the methods. One process includes feeding vitrifiable material into a melter vessel, the melter vessel including a fluid-cooled refractory panel in its floor, ceiling, and/or sidewall, and heating the vitrifiable material with a burner directing combustion products into the melting zone under a level of the molten material in the zone. Burners impart turbulence to the molten material in the melting zone. The fluid-cooled refractory panel is cooled, forming a modified panel having a frozen or highly viscous material layer on a surface of the panel facing the molten material, and a sensor senses temperature of the modified panel using a protected thermocouple positioned in the modified panel shielded from direct contact with turbulent molten material. Processes include controlling the melter using the temperature of the modified panel. Other processes and systems are presented.

9 Claims, 16 Drawing Sheets

(56) References Cited

U.S. PATENT DOCUMENTS

| | | | |
|---|---|---|---|
| 2,455,907 A | 1/1948 | Slayter | |
| 3,170,781 A | 2/1965 | Keefer | |
| 3,237,929 A | 3/1966 | Plumat et al. | |
| 3,248,206 A * | 4/1966 | Apple et al. | 65/347 |
| 3,260,587 A | 7/1966 | Dolf et al. | |
| 3,294,512 A | 12/1966 | Penberthy | |
| 3,420,510 A * | 1/1969 | Griem, Jr. | 432/13 |
| 3,563,683 A | 2/1970 | Hess | |
| 3,592,623 A | 7/1970 | Shepherd | |
| 3,547,611 A * | 12/1970 | Williams | 65/129 |
| 3,573,016 A * | 3/1971 | Rees | 65/380 |
| 3,600,149 A * | 8/1971 | Chen et al. | 65/162 |
| 3,606,825 A | 9/1971 | Johnson | |
| 3,617,234 A | 11/1971 | Hawkins et al. | |
| 3,627,504 A | 12/1971 | Johnson et al. | |
| 3,738,792 A | 6/1973 | Feng | |
| 3,746,527 A | 7/1973 | Knavish et al. | |
| 3,764,287 A | 10/1973 | Brocious | |
| 3,771,988 A | 11/1973 | Starr | |
| 3,856,496 A | 12/1974 | Nesbitt et al. | |
| 3,885,945 A | 5/1975 | Rees et al. | |
| 3,951,635 A | 4/1976 | Rough | |
| 3,976,464 A | 8/1976 | Wardlaw | |
| 4,028,083 A * | 6/1977 | Patznick et al. | 65/29.21 |
| 4,110,098 A | 8/1978 | Mattmuller | |
| 4,185,982 A | 1/1980 | Schwenninger | |
| 4,203,761 A | 5/1980 | Rose | |
| 4,205,966 A | 6/1980 | Horikawa | |
| 4,303,435 A | 12/1981 | Sleighter | |
| 4,323,718 A | 4/1982 | Buhring et al. | |
| 4,349,376 A | 9/1982 | Dunn et al. | |
| 4,405,351 A * | 9/1983 | Sheinkop | 65/29.21 |
| 4,406,683 A | 9/1983 | Demarest | |
| 4,424,071 A | 1/1984 | Steitz et al. | |
| 4,539,034 A | 9/1985 | Hanneken | |
| 4,798,616 A | 1/1989 | Knavish et al. | |
| 4,816,056 A | 3/1989 | Tsai et al. | |
| 5,169,424 A | 12/1992 | Grinnen et al. | |
| 5,405,082 A | 4/1995 | Brown et al. | |
| 5,522,721 A | 6/1996 | Drogue et al. | |
| 5,613,994 A | 3/1997 | Muniz et al. | |
| 5,713,668 A | 2/1998 | Lunghofer et al. | |
| 5,718,741 A | 2/1998 | Hull et al. | |
| 5,814,121 A | 9/1998 | Travis | |
| 5,887,978 A | 3/1999 | Lunghofer et al. | |
| 5,944,864 A | 8/1999 | Hull et al. | |
| 6,036,480 A | 3/2000 | Hughes et al. | |
| 6,244,197 B1 | 6/2001 | Coble | |
| 6,314,760 B1 | 11/2001 | Chenoweth | |
| 6,344,747 B1 | 2/2002 | Lunghofer et al. | |
| 6,454,562 B1 * | 9/2002 | Joshi et al. | 432/17 |
| 6,460,376 B1 | 10/2002 | Jeanvoine et al. | |
| 6,701,751 B2 * | 3/2004 | Arechaga et al. | 65/162 |
| 6,715,319 B2 | 4/2004 | Barrow et al. | |
| 6,739,152 B2 | 5/2004 | Jeanvoine et al. | |
| 6,796,147 B2 * | 9/2004 | Borysowicz et al. | 65/162 |
| 6,857,999 B2 | 2/2005 | Jeanvoine | |
| 6,883,349 B1 | 4/2005 | Jeanvoine | |
| 7,273,583 B2 | 9/2007 | Rue et al. | |
| 7,383,698 B2 | 6/2008 | Ichinose et al. | |
| 7,392,668 B2 | 7/2008 | Adams et al. | |
| 7,428,827 B2 | 9/2008 | Maugendre et al. | |
| 7,448,231 B2 | 11/2008 | Jeanvoine et al. | |
| 7,509,819 B2 | 3/2009 | Baker et al. | |
| 7,565,819 B2 | 7/2009 | Jeanvoine et al. | |
| 7,622,677 B2 | 11/2009 | Barberree et al. | |
| 8,033,254 B2 | 10/2011 | Hannum et al. | |
| 8,424,342 B2 * | 4/2013 | Kiefer et al. | 65/29.19 |
| 8,973,400 B2 * | 3/2015 | Charbonneau et al. | 65/29.12 |
| 2002/0124598 A1 * | 9/2002 | Borysowicz et al. | 65/158 |
| 2002/0134112 A1 | 9/2002 | Barrow et al. | |
| 2002/0162358 A1 | 11/2002 | Jeanvoine et al. | |
| 2002/0166343 A1 | 11/2002 | LeBlanc | |
| 2003/0000250 A1 * | 1/2003 | Arechaga et al. | 65/29.19 |
| 2003/0015000 A1 | 1/2003 | Hayes et al. | |
| 2003/0029197 A1 | 2/2003 | Jeanvoine et al. | |
| 2003/0037571 A1 | 2/2003 | Kobayashi et al. | |
| 2004/0131988 A1 | 7/2004 | Baker et al. | |
| 2004/0168474 A1 | 9/2004 | Jeanvoine et al. | |
| 2004/0224833 A1 | 11/2004 | Jeanvoine et al. | |
| 2006/0000239 A1 | 1/2006 | Jeanvoine et al. | |
| 2006/0122450 A1 * | 6/2006 | Kim et al. | 588/6 |
| 2006/0144089 A1 * | 7/2006 | Eichholz et al. | 65/29.21 |
| 2007/0122332 A1 | 5/2007 | Jacques et al. | |
| 2007/0212546 A1 | 9/2007 | Jeanvoine et al. | |
| 2008/0256981 A1 | 10/2008 | Jacques et al. | |
| 2008/0276652 A1 * | 11/2008 | Bauer et al. | 65/454 |
| 2009/0042709 A1 | 2/2009 | Jeanvoine et al. | |
| 2009/0120133 A1 * | 5/2009 | Fraley et al. | 65/135.6 |
| 2011/0236846 A1 | 9/2011 | Rue et al. | |
| 2011/0308280 A1 | 12/2011 | Huber | |
| 2012/0077135 A1 | 3/2012 | Charbonneau | |
| 2012/0216568 A1 * | 8/2012 | Fisher et al. | 65/29.21 |
| 2013/0086952 A1 * | 4/2013 | Charbonneau et al. | 65/377 |

OTHER PUBLICATIONS

"Glass Technologies—The Legacy of a Successful Public-Private Partnership", 2007, U.S. Department of Energy, pp. 1-32.

Muijsenberg, H.P.H., Neff, G., Muller, J., Chmelar, J., Bodi, R., and Matustikj, F., "An Advanced Control System to Increase Glass Quality and Glass Production Yields Based on GS ESLLI Technology", in a Collection of Papers Presented at the 66th Conference on Glass Problems: Ceramic Engineering and Science Proceedings, 2008, vol. 27, Issue 1 (ed W.M. Kriven), John Wiley & Sons, Inc., Hoboken, NJ, USA. doi:10.1002/9780470470291306.ch3.

Rue, "Energy-Efficient Glass Melting—The Next Generation Melter", Gas Technology Institute, Project No. 20621 Final Report, 2008.

Muijsenberg, E., Eisenga, M. and Buchmayer, J., "Increase of Glass Production Efficiency and Energy Efficiency with Model-Based Predictive Control", in 70th Conference on Glass Problems: Ceramic Engineering and Science Proceedings, 2010, vol. 31, Issue 1 (ed C. H. Drummond), John Wiley & Sons, Inc., Hoboken, NJ, USA. doi: 10.1022/9780470769843.ch15.

"Canty Process Technology" brochure, date unknown, copy received in Apr. 2012 at American Institute of Chemical Engineers, Spring Meeting, Houston, TX.

U.S. Appl. No. 12/817,754, filed Jun. 17, 2010, Huber.
U.S. Appl. No. 12/888,970, filed Sep. 23, 2010, Charbonneau.
U.S. Appl. No. 13/268,028, filed Oct. 7, 2011, Charbonneau.
U.S. Appl. No. 13/268,065, filed Oct. 7, 2011, Charbonneau et al.
U.S. Appl. No. 13/268,130, filed Oct. 7, 2011, Charbonneau et al.
U.S. Appl. No. 13/458,211, filed Apr. 27, 2012, Mobley et al.

* cited by examiner

SUBMERGED COMBUSTION MELTING PROCESSES FOR PRODUCING GLASS AND SIMILAR MATERIALS, AND SYSTEMS FOR CARRYING OUT SUCH PROCESSES

STATEMENT REGARDING FEDERALLY SPONSORED RESEARCH OR DEVELOPMENT

This invention was made with government support under contract number DE-FC36-03GO13092 awarded by the United States Department of Energy. The government has certain rights in the invention.

THE NAMES OF THE PARTIES TO A JOINT RESEARCH AGREEMENT

The parties to the above-mentioned government contract were Gas Technology Institute, Fluent, Inc., Praxair, Inc., AC Leadbetter & Sons Inc., and Combustion Tec/Eclipse, and a consortium of the following parties: Corning Incorporated, Gas Technology Institute, Johns Manville, PPG Industries, Inc., Schott North America, Regional Research and Development, Duryea, a Division of Schott North America, Inc., Owens Corning Corporation, and the Glass Manufacturing Industry Council.

BACKGROUND INFORMATION

1. Technical Field

The present disclosure relates generally to the field of combustion furnaces and methods of use, and more specifically to submerged combustion melters and methods of use in producing molten glass and similar materials using one or more measured temperatures for control of a submerged combustion melter, and systems for carrying out such methods.

2. Background Art

In submerged combustion melting of glass and similar materials, combustion gases emitted from sidewall-mounted and/or floor-mounted burners are injected beneath the surface of the molten mass and rise upward through the melt. The material is heated at a high efficiency via the intimate contact with the combustion gases. Using submerged combustion burners produces violent turbulence of the molten material, which may include unmelted material as well as gases. Vibration of the burners and/or the melter walls themselves, due to sloshing of molten material, pulsing of combustion burners, popping of large bubbles above submerged burners, ejection of molten material from the melt against the walls and ceiling of melter, and the like, are possible. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Given that long melter life, and control of the melter during that life are goals for submerged combustion melters and sensors, this failure of sensors is a significant detriment to those goals. Submerged combustion has been proposed in several patents for application in commercial glass melting, including U.S. Pat. Nos. 4,539,034; 3,170,781; 3,237,929; 3,260,587; 3,606,825; 3,627,504; 3,738,792; 3,764,287; 6,460,376; 6,739,152; 6,857,999; 6,883,349; 7,273,583; 7,428,827; 7,448,231; and 7,565,819; and published U.S. Patent Publication numbers 2004/0168474; 2004/0224833; 2007/0212546; 2006/0000239; 2002/0162358; 2009/0042709; 2008/0256981; 2008/0276652; 2007/0122332; 2004/0168474; 2004/0224833; 2007/0212546; and 2011/0308280.

Rue, "Energy-Efficient Glass Melting—The Next Generation Metter", Gas Technology Institute, Project No. 20621 Final Report (2008) noted that, in submerged combustion melters using oxy-fuel burners to melt glass precursors, one of the most difficult measurements to make is the actual melt temperature. In one try in a small melter, platinum-clad thermocouples failed when exposed directly to the melt after a short time period because of the interaction with oxy-fuel flame. Stable, controlled combustion of the fuel within the melt is required or highly desirable in submerged combustion melting, according to this report. There are three ways to attack this problem according to this report: flame stabilization, such as in U.S. Pat. No. 7,273,583; splitting the fuel-oxidant mixture into smaller jets; and/or preheating the fuel/oxidant mixture. However, there is no teaching or suggestion that accurate melt temperature may be indirectly measured and used to control operation of the melter to achieve a desired actual melt temperature. Rue also notes that the heat flux through the frozen or highly viscous melt layer (present in submerged combustion melters having fluid-cooled panels) is determined by the properties of the processed material and the temperature and turbulence of the melt. It is therefore undesirable to superheat the melt because this increases the heat flux through the walls (and frozen melt layer). Heat flux through cooled panel walls is relatively independent of the temperature of the coolant according to this report, since the thickness of the frozen layer compensates for any increase or decrease in coolant temperature. Therefore, knowledge of melt temperature is critical to controlling heat flux.

Muijsenberg, et al., "An Advanced Control System to Increase Glass Quality and Glass Production Yields Based on GS ESLLI Technology" 66th Conference on Glass Problems: Ceramic Engineering and Science Proceedings, Volume 27, Issue 1, Chapter 3, published online 26 Mar. 2008, noted that, in the context of conventional (non-submerged combustion) glass furnaces, when the glass production needs to produce products of consistent excellent glass quality at high yield and low energy usage, it is almost impossible to control the production manually. Therefore a group of advanced control techniques was developed for an automatic control. One commonly used is Model (based) Predictive Control (MPC). Correct usage of MPC together with knowledge of glass production, according to this article, results in process stabilization, increasing glass quality and energy savings.

An advanced temperature measurement system was developed for conventional glass furnaces including "self-verifying temperature sensors", such as disclosed in U.S. Pat. Nos. 5,713,668 and 5,887,978. Even with these improvements, however, it is not clear if these temperature sensors would stand the rigors of highly turbulent submerged combustion melters. As noted above by Rue, the interaction with oxy-fuel flames would no doubt be severely detrimental to these sensors as well.

It would be a significant advance in the glass melting art to develop processes of operating submerged combustion melters, and systems to carry out the processes in producing molten glass and similar materials using one or more methods of indirectly measuring temperature of the molten material in the melting zone of the melter.

SUMMARY

In accordance with the present disclosure, methods and systems for carrying out the methods are described that reduce or eliminate problems associated with temperature sensor failure in monitoring and/or controlling submerged combustion melters. The methods and systems described herein are relevant to the full range of materials that could be melted with submerged combustion technology.

A first aspect of this disclosure is a process comprising:
a) feeding at least one partially or wholly vitrifiable material into a feed inlet of a melting zone of a melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in the melting zone, the melter vessel comprising at least one fluid-cooled refractory panel in its floor, ceiling, and/or sidewall;
b) heating the at least one partially or wholly vitrifiable material with at least one burner directing combustion products into the melting zone under a level of the molten material in the zone, one or more of the burners configured to impart turbulence to at least some of the molten material in the melting zone;
c) discharging molten material from the melter vessel through the melter exit structure;
d) cooling the at least one fluid-cooled refractory panel sufficiently to form a modified panel comprising a frozen or highly viscous material layer, or combination thereof, on at least a portion of a surface of the panel facing the molten material;
e) sensing one or more temperatures that provide an indirect indication of an actual melt temperature of at least a portion of the turbulent molten material in the melting zone; and
f) controlling at least one of steps (a)-(d) using at least one of the temperatures of step (e) to achieve a desired melt temperature of at least a portion of the turbulent molten material in the melting zone.

A second aspect of this disclosure is a process comprising:
a) feeding at least one partially or wholly vitrifiable material into a feed inlet of a melting zone of a melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in the melting zone, the melter vessel comprising at least one fluid-cooled refractory panel in its floor, ceiling, and/or sidewall;
b) heating the at least one partially or wholly vitrifiable material with at least one burner directing combustion products into the melting zone under a level of the molten material in the zone, one or more of the burners configured to impart turbulence to at least some of the molten material in the melting zone;
c) discharging molten material from the melter vessel through the melter exit structure;
d) cooling the at least one fluid-cooled refractory panel sufficiently to form a modified panel comprising a frozen or highly viscous material layer, or combination thereof, on at least a portion of a surface of the panel facing the molten material;
e) sensing a temperature of the modified panel using one or more protected thermocouples positioned in the modified panel so as to be shielded from direct contact with turbulent molten material in the melting zone; and
f) controlling at least one of steps (a)-(d) using the temperature of the modified panel to achieve a desired melt temperature of at least a portion of the turbulent molten material in the melting zone.

A third aspect of this disclosure is a system comprising:
melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in the melting zone, the melter vessel comprising at least one fluid-cooled refractory panel in its floor, ceiling, and/or sidewall, and one or more burners, at least one of which is positioned to direct combustion products into the melting zone under a level of molten material in the melting zone and form a turbulent molten material, the fluid-cooled panel configured to be modified during operation of the melter vessel to have a frozen or highly viscous material layer, or combination thereof, formed on at least a portion of a surface of the panel facing the molten material, the melter vessel further comprising a one or more thermocouples for sensing a temperature of the modified panel using one or more protected thermocouples positioned in the modified panel so as to be shielded from direct contact with turbulent molten material in the melting zone; and a controller configured to control the melter vessel using the temperature of the modified panel to achieve a desired melt temperature of at least a portion of the turbulent molten material in the melting zone.

Processes and systems of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
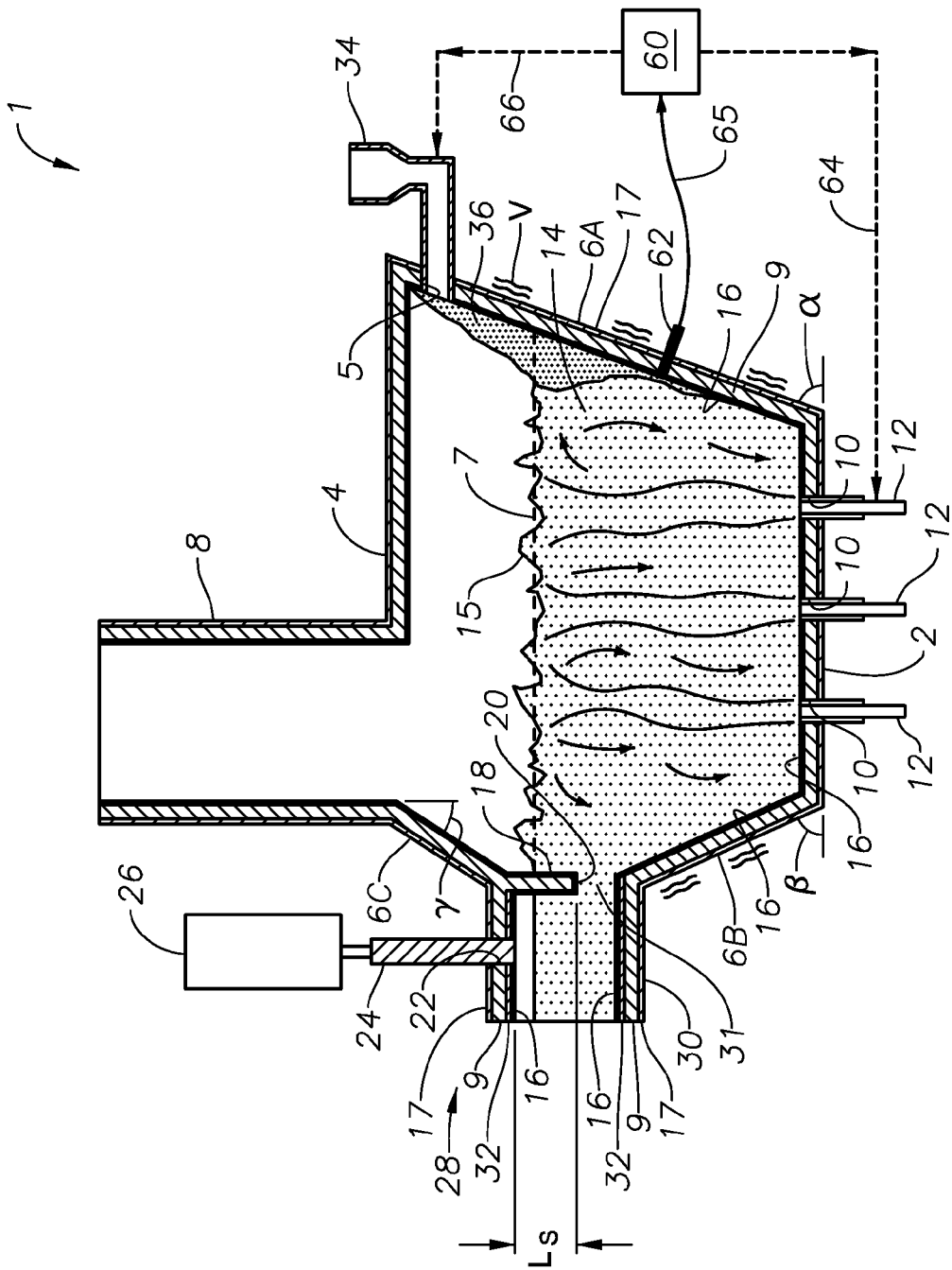
FIGS. 1, 4, 6, 9, and 13 are vertical sectional views of five system embodiments in accordance with the present disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of various melter apparatus and process embodiments in accordance with the present disclosure. However, it will be understood by those skilled in the art that the melter apparatus and processes of using same may be practiced without these details and that numerous variations or modifications from the described embodiments may be possible which are nevertheless considered within the appended claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

"Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner). As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

The phrase "turbulent molten glass imparting mechanical energy to the melter vessel" means that during submerged combustion, the molten glass is very turbulent, sometimes extraordinarily so. This high degree of turbulence can increase the mechanical load on the melter vessel walls significantly, especially in embodiments where the walls are fluid-cooled, as fluid-cooled wall structures may be made thinner than non-cooled walls since the frozen or highly viscous glass layer protects the walls better than non-cooled walls. Therefore, while there may be savings in cost of materials for submerged combustion melter vessels with thinner, fluid-cooled walls, and fuel savings due to better heat transfer to the melt, there may be adverse physical impacts on the melter structure due to the very high turbulence imparted during submerged combustion.

The phrase "sensing one or more temperatures that provide an indirect indication of an actual melt temperature of at least a portion of the turbulent molten material in the melting zone" means, as further explained herein, essentially that a probe, sensor or other device measures not a temperature of the turbulent molten material in the melting zone itself, but a temperature or temperatures of components or flow streams that are not themselves molten material in the melting zone. Examples include, but are not limited to, temperature of the refractory walls of melters, temperature of skimmer refractory, temperature of fluid-cooled dam refractory, temperature of melter outlet structure refractory, temperature of exhaust duct refractory or metal, temperature of the frozen or highly viscous material layer on any of the previous components, temperature of the exhaust stream, temperature of the non-turbulent molten material discharged from the melter, temperature of the non-turbulent molten material flowing is a forehearth or other channel downstream of the melter, and the like. One or more temperatures of the same or different components or streams may be used, or combinations of component temperatures and flowing stream temperatures.

The phrase "controlling at least one of steps (a)-(d) using at least one of the temperatures of step (e) to achieve a desired melt temperature of at least a portion of the turbulent molten material in the melting zone", means that one or more of the steps of feeding, heating, discharging, and cooling, some or all of which may occur simultaneously, continuously, semi-continuously, or in batch operation, may be used to control the melter operation.

The term "air-fuel burner" means a combustion burner that combusts one or more fuels with only air, while the term "oxy-fuel burner" means a combustion burner that combusts one or more fuels with either oxygen alone, or employs oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. "Air" as used herein includes ambient air as well as gases having the same molar concentration of oxygen as air. "Oxygen-enriched air" means air having oxygen concentration greater than 21 mole percent. "Oxygen" includes "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The term "fuel", according to this disclosure, means a combustible composition (either in gaseous, liquid, or solid form, or any flowable combination of these) comprising a major portion of, for example, methane, natural gas, liquefied natural gas, propane, atomized oil, powders or the like. Fuels useful in the disclosure may comprise minor amounts of non-fuels therein, including oxidants, for purposes such as premixing the fuel with the oxidant, or atomizing liquid fuels.

At least some of the burners may be floor-mounted, and in certain embodiments the floor-mounted burners may be positioned in one or more parallel rows substantially perpendicular to a longitudinal axis of the melter. In certain embodiments, the number of floor-mounted burners in each row may be proportional to width of the melter. In certain embodiments the depth of the melter may decrease as width of the melter decreases. In certain other embodiments, an intermediate location may comprise a constant width zone positioned between an expanding zone and a narrowing zone of the melter, in accordance with assignee's co-pending U.S. patent application Ser. No. 12/817,754, filed Jun. 17, 2010, published as US 20110308280 on Dec. 22, 2011.

At least some of the burners may be oxy-fuel burners. In certain embodiments the oxy-fuel burners may comprise one or more submerged oxy-fuel combustion burners each having co-axial fuel and oxidant tubes forming an annular space there between, wherein the outer tube extends beyond the end of the inner tube, as taught in U.S. Pat. No. 7,273,583. In certain other embodiments the oxy-fuel burners may comprise one or more adjustable flame submerged oxy-fuel combustion burners as taught in assignee's co-pending U.S. patent application Ser. No. 13/268,028, filed Oct. 7, 2011.

In certain embodiments, the melter apparatus may have a floor size for a given throughput of 2 $ft^2$/stpd or less, and in certain embodiment may have a floor size for a given throughput of 0.5 $ft^2$/stpd or less, where "stpd" means "short tons per day." Stated differently, in certain embodiments, the methods herein may comprise discharging at least 0.5 short tons per day per square foot of melter floor, and in certain exemplary processes, at least 2 short tons per day per square foot of melter floor.

The term "fluid-cooled" means cooling using gaseous, liquid, or combination thereof, heat transfer media. In certain exemplary embodiments, wherein the melter wall comprises fluid-cooled panels, the wall may comprise a refractory liner at least between the panels and the molten glass.

Certain exemplary apparatus and methods may comprise cooling various components using fluid-cooled refractory panels and directing a heat transfer fluid through the panels. In certain embodiments, the refractory cooled-panels comprising the walls, the fluid-cooled skimmer, the fluid-cooled dam, and the walls of the fluid-cooled transition channel may be cooled by a heat transfer fluid selected from the group consisting of gaseous, liquid, or combinations of gaseous and liquid compositions that functions or is capable of being modified to function as a heat transfer fluid. Different cooling fluids may be used in the various components, or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof; for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Figure 11:
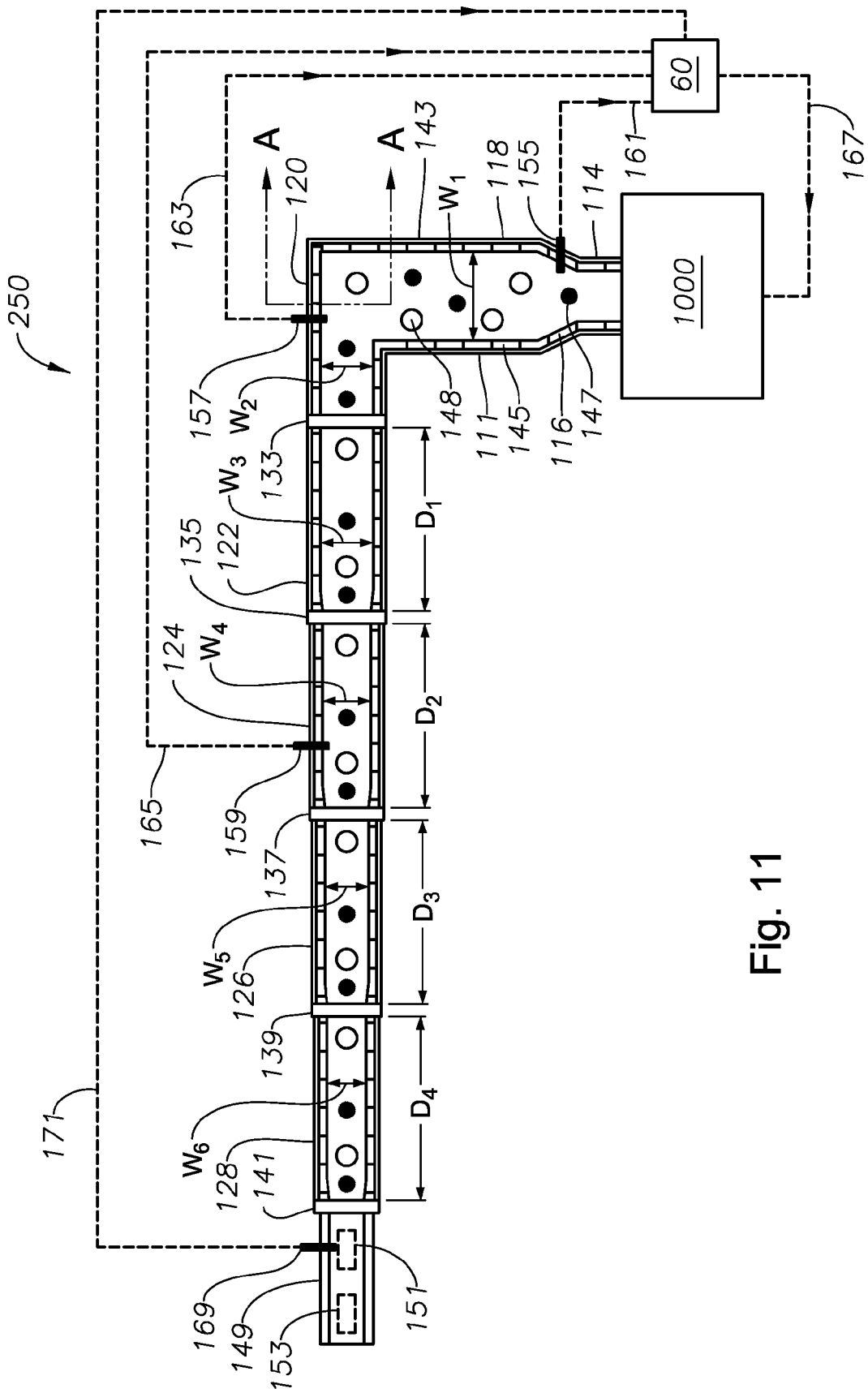
FIG. 11 is a plan view of a sixth system in accordance with the present disclosure.

Referring now to the figures, FIGS. 1, 4, 6, 9, and 13 are vertical sectional views, of five system embodiments in accordance with the present disclosure, while FIG. 11 is a plan view of another system embodiment. The same numerals and symbols are used for the same or similar features in the various figures. It will be understood in each case that some components are not illustrated in order to illustrate more clearly the key features of each embodiment. System embodiments 1, 40, 50, 90, and 130 of FIGS. 1, 4, 6, 9, and 13, respectively, each comprise a melter having a floor 2, a roof or ceiling 4, a feed end wall 6A, a first portion of an exit end wall 6B, and a second portion of the exit end wall 6C. Feed end wall 6A and exit end wall portion 6B may form angles "α" and "β", respectively, with respect to floor 2, as indicated. Angles α and β may be the same or different, and generally may range from about 30 degrees to about 90 degrees, or from about 45 degrees to about 75 degrees. Decreasing these angles beyond these ranges may require more floor space for the melters, and/or more material of construction, both of which are generally undesirable. Increasing these angles may promote dead spaces in corners, which is also undesirable. Exit end wall portion 6C may form an angle "γ" with respect to skimmer 18. Angle γ may be the range from 0 to about 70 degrees, or from about 30 degrees to about 75 degrees. Increasing this angle beyond these ranges may require more floor space for the melters, and/or more material of construction, both of which are generally undesirable. Decreasing this angle may promote escape of unmelted or melted material up stack 8, or deposition onto internal surfaces of stack 8, both of which are also undesirable. A frozen and/or highly viscous glass layer or layers 16 may be formed on the inside surfaces of walls 6A, 6B, due to the use of fluid-cooled panels for these walls.

Figure 2:
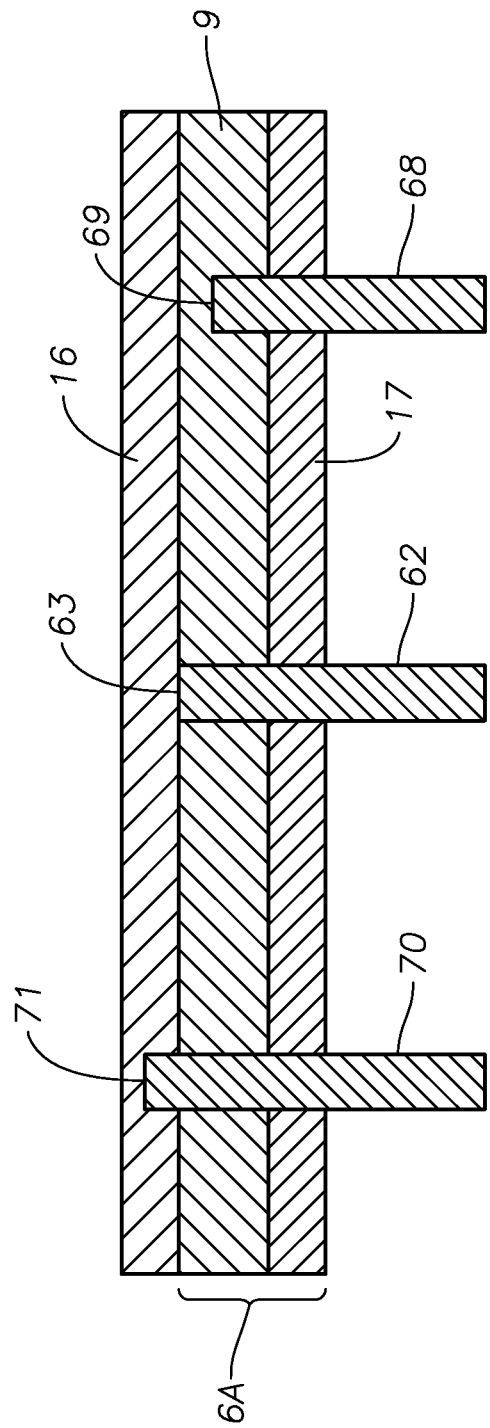
FIG. 2 is a cross-sectional, close up view of a portion of the system of FIG. 1.

One or more or all of walls 6A, 6B, 6C, floor 2, and roof 4 may be comprised of a metal shell 17 and a fluid-cooled refractory panel 9, as more fully apparent in the cross-sectional view of FIG. 2.

System embodiment 1 further includes an exhaust stack 8, and openings 10 for floor-mounted submerged combustion burners 12, which create during operation a highly turbulent melt indicated at 14. In certain embodiments, burners 12 are positioned to emit combustion products into molten glass in the melting zone 14 in a fashion so that the gases penetrate the melt generally perpendicularly to floor 2. In other embodiments, one or more burners 12 may emit combustion products into the melt at an angle to floor 2, where the angle may be more or less than 45 degrees, but in certain embodiments may be 30 degrees, or 40 degrees, or 50 degrees, or 60 degrees, or 70 degrees, or 80 degrees.

The initial raw material can be introduced into the melter of system 1 on a batch, semi-continuous or continuous basis. In some embodiments, a port 5 is arranged at end 6A of the melter through which the initial raw material is introduced by a feeder 34. In some embodiments a "batch blanket" 36 may form along wall 6A, as illustrated. Feed port 5 may be positioned above the average glass melt level, indicated by dashed line 7. The amount of the initial raw material introduced into the melter is generally a function of, for example, the capacity and operating conditions of the melter as well as the rate at which the molten material is removed from the melter.

The initial raw material may include any material suitable for forming molten glass such as, for example, limestone, glass, sand, soda ash, feldspar and mixtures thereof. In one embodiment, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. application 20080276652. The initial raw material can be provided in any form such as, for example, relatively small particles.

As noted herein, submerged combustion burners may produce violent turbulence of the molten glass and may result in sloshing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure have one or more features that attempt to preserve the benefits of submerged combustion, while decreasing some of these disadvantages. One important aspect of processes and systems of the present disclosure is indirect measurement of melt temperature in the melter itself. FIG. 2 exemplifies three embodiments of doing this using thermocouples. Wall 6A is illustrated in cross-section in FIG. 2, and has a thermocouple 62 inserted in wall 6A so that its distal end 63 is flush with the face of refractory layer 9. During operation, a frozen and/or highly viscous layer 16 of molten material forms over refractory layer 9 substantially as illustrated, due to cooling effect of cooling fluid flowing through conduits in refractory layer 9 (not illustrated in FIG. 2). In this way, thermocouple 62 and its tip 63 are protected from the harsh conditions existing in the turbulent molten material inside the melter. FIG. 2 also illustrates two other optional locations of thermocouples 68 and 70. Thermocouple 68 has a distal tip 69 buried in refractory layer 9, while thermocouple 70 has its distal tip 71 extending beyond refractory layer 9 and buried in the frozen and/or highly viscous layer 16.

Using one or more thermocouples 62, 68, and/or 70 allows monitoring and/or control of the melter, for example using a controller indicated at 60. Referring to FIG. 1, a signal 65 is transmitted by wire or wirelessly from thermocouple 62 to controller 60, which may control the melter by adjusting any number of parameters, in this embodiment feed rate of feeder 34 may be adjusted through a signal 66, and one or more of burners 12 may be adjusted via a signal 64, it being understood that suitable transmitters and actuators, such as valves and the like, are not illustrated for clarity.

Referring again to FIG. 1, system embodiment 1 includes a melter exit structure 28 for discharging the molten glass or similar material. Melter exit structure 28 is positioned generally downstream of melter exit ends 6B, 6C as illustrated of FIGS. 1 and 2, and fluidly and may mechanically connect the melter vessel to a molten glass conditioning channel (not illustrated). Melter exit structure 28 comprises a fluid-cooled transition channel 30, having generally rectangular cross-section in embodiment 1, although any other cross-section would suffice, such as hexagonal, trapezoidal, oval, circular, and the like. Regardless of cross-sectional shape, fluid-cooled transition channel 30 is configured to form a frozen glass layer or highly viscous glass layer, or combination thereof, on inner surfaces of fluid-cooled transition channel 30 and thus protect melter exit structure 28 from the mechanical energy imparted from the melter vessel to melter exit structure 28. Melter exit structure 28 may in certain embodiments comprise an essentially rectangular, fluid-cooled, ceramic or metallic box having a length L, a width W, a height H. In these embodiments, length L may range from about 5 to about 50 percent, or from about 10 to about 40 percent, of the entire length of the melter apparatus. The width W of melt exit structure 28 may be the same as the width of the melter apparatus, or may be less or more than the width of the melter apparatus. The height H may range from about 5 to about 50 percent, or from about 10 to about 40 percent, of the entire height of the melter apparatus, measured from floor 2 to ceiling 4. Melter length, width and height depend primarily on the amount of raw material to be fed, the amount of molten glass to be produced, and the desired throughputs mentioned herein.

A fluid-cooled skimmer 18 may be provided, extending downward from the ceiling of the melter vessel and positioned upstream of fluid-cooled transition channel 30. Fluid-cooled skimmer 18 has a lower distal end 20 extending a distance $L_s$ ranging from about 1 inch to about 12 inches (from about 2.5 cm to about 30 cm) below the average melt level 7. Fluid-cooled skimmer 18 may be configured to form a frozen glass layer or highly viscous glass layer, or combination thereof, on its outer surfaces. Skimmer lower distal end 20 defines, in conjunction with a lower wall of melter exit structure 28, a throat 31 of the melter vessel, throat 31 configured to control flow of molten glass from the melter vessel into melter exit structure 28. Preferably, the throat 31 is arranged below average melt level 7. Molten material can be removed from melter exit structure 28 on a batch, semi-continuous basis or continuous basis. In an exemplary embodiment, the molten material continuously flows through throat 31 and generally horizontally through melter exit structure 28, and is removed continuously from melter exit structure 28 to a conditioning channel (not illustrated). Thereafter, the molten material can be processed by any suitable known technique, for example, a process for forming glass fibers.

Certain embodiments may include an overlapping refractory material layer 32 on at least the inner surface of fluid-cooled transition channel 30 that are exposed to molten material. In certain embodiments the overlapping refractory material may comprise a seamless insert of dense chrome, molybdenum, or other dense ceramic or metallic material. The dense chrome or other refractory material may be inserted into the melter exit structure and may provide a seamless transition form the melter vessel to a conditioning channel (not illustrated).

Another optional feature of system embodiment 1 is the provision of a fluid-cooled dam opening 22 in the upper wall or ceiling of melt exit structure 28. Dam opening 22 accommodates a movable, fluid-cooled dam 24, which is illustrated schematically in FIG. 1 in a retracted position. Dam 24 may be manipulated by a prime mover 26, such as one or more motors, jack screws, or the like. Fluid-cooled dam 24 comprises dimensions allowing the dam to be extended an entire distance from top to bottom of fluid-cooled transition channel 30 and completely isolate the melting zone of the melter vessel from the conditioning channel.

Figure 4:
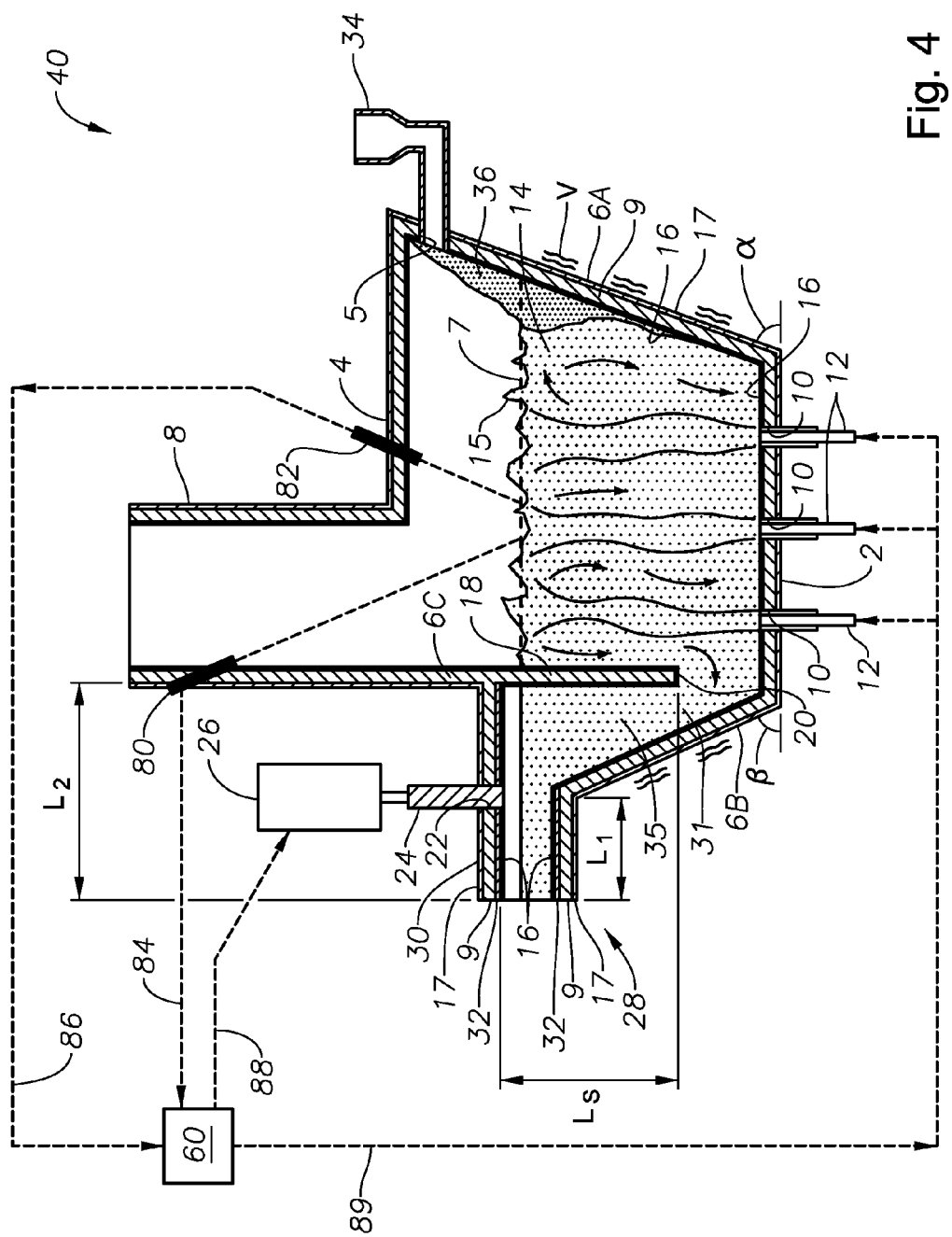

System embodiment 40 illustrated schematically in FIG. 4 differs from system embodiment 1 illustrated in FIG. 1 by having one or more optical temperature measuring devices 80, 82 measuring surface temperature of the turbulent molten material surface 14. Embodiment 40 also differs from embodiment 1 by having skimmer 18 extend substantially more into the melt than skimmer 18 in embodiment 1. In embodiment 40, skimmer 18 is positioned a distance $L_2$ from the exit of melter exit structure 28. $L_2$ is greater than the length $L_1$, which is the length of the lower wall of melter exit structure 28. The absolute dimensions of $L_1$ and $L_2$ are not critical except that $L_2$ must be greater than $L_1$. For example, $L_2$ may be twice that of $L_1$, or $L_2$ may be 1.5 times that of $L_1$. The ratio of length $L_2$ and $L_1$ will also depend on angle "β." In melter apparatus embodiment 40, skimmer 18 extends downwardly substantially in line with a downstream wall of stack 8 such that lower distal end 20 forms a submerged throat 31 with end wall portion 6B. Lower distal end 20 may extend sufficiently low so that submerged throat 31 is positioned roughly in the lowest one third of the molten bath, or even in the lowest one fourth or lowest one eighth portion of the molten bath. This submerged throat position forces the melt generally in the lower regions of the melter to exit prior to molten glass in the upper or even the middle regions of the melter. Further, the molten glass travels generally vertically through a generally less turbulent zone 35 after passing through throat 31, and then generally horizontally through and out of melter exit structure 28. Signals 84, 86 from optical sensors 80, 82, respectively, are sent to controller 60, and control signals 88, 89 are sent from controller 60 to control discharge of non-turbulent material flowing out of the melter, for example by adjusting fluid-cooled dam 24, and adjusting one or more burners 12.

Figure 6:
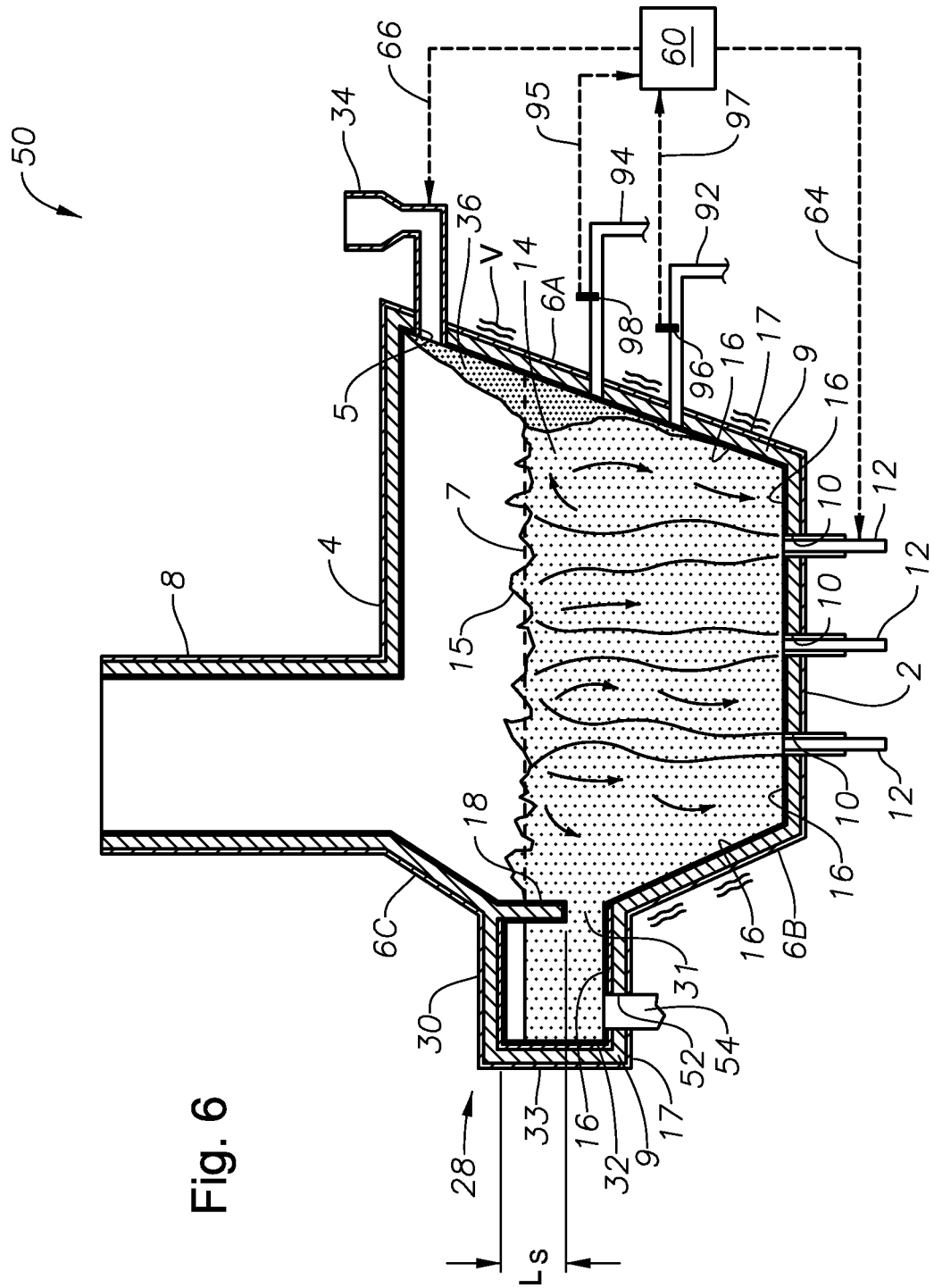

System embodiment 50 illustrated in FIG. 6 is similar to embodiment 1 illustrated schematically in FIG. 1, except that melter exit structure 28 in embodiment 50 comprises a fluid-cooled end wall 33 and at least one opening 52 in a bottom wall of melter exit structure 28. The melter in embodiment 50 as illustrated has one opening 52, which accommodates one downwardly protruding melt flow tube 54. End wall 33 effectively forces molten material to change flow direction, from substantially horizontal to substantially vertically downward. This flow pattern completely decouples melt exit structure 28 and fluid-cooled transition channel 30 from any downstream conditioning channel (not illustrated), substantially reducing or completely eliminating transfer of all mechanical energy, such as vibrational energy, from the melter to the condition channel, while maintaining or substantially maintaining the temperature of the melt. In accordance with the present disclosure, system embodiment 50 includes a cooling fluid inlet conduit 92 and a cooling fluid outlet conduit 94 for refractory layer 9 of sidewall 6A, similar to the arrangement described in relation to FIG. 7. Temperature sensors 96, 98 may measure the temperature of inlet coolant fluid and outlet coolant fluid, respectively, and send signals 97, 95 to controller 60. Controller 60 may then send signals for adjustment of one or more burners 12 and feeder 34.

Figure 9:
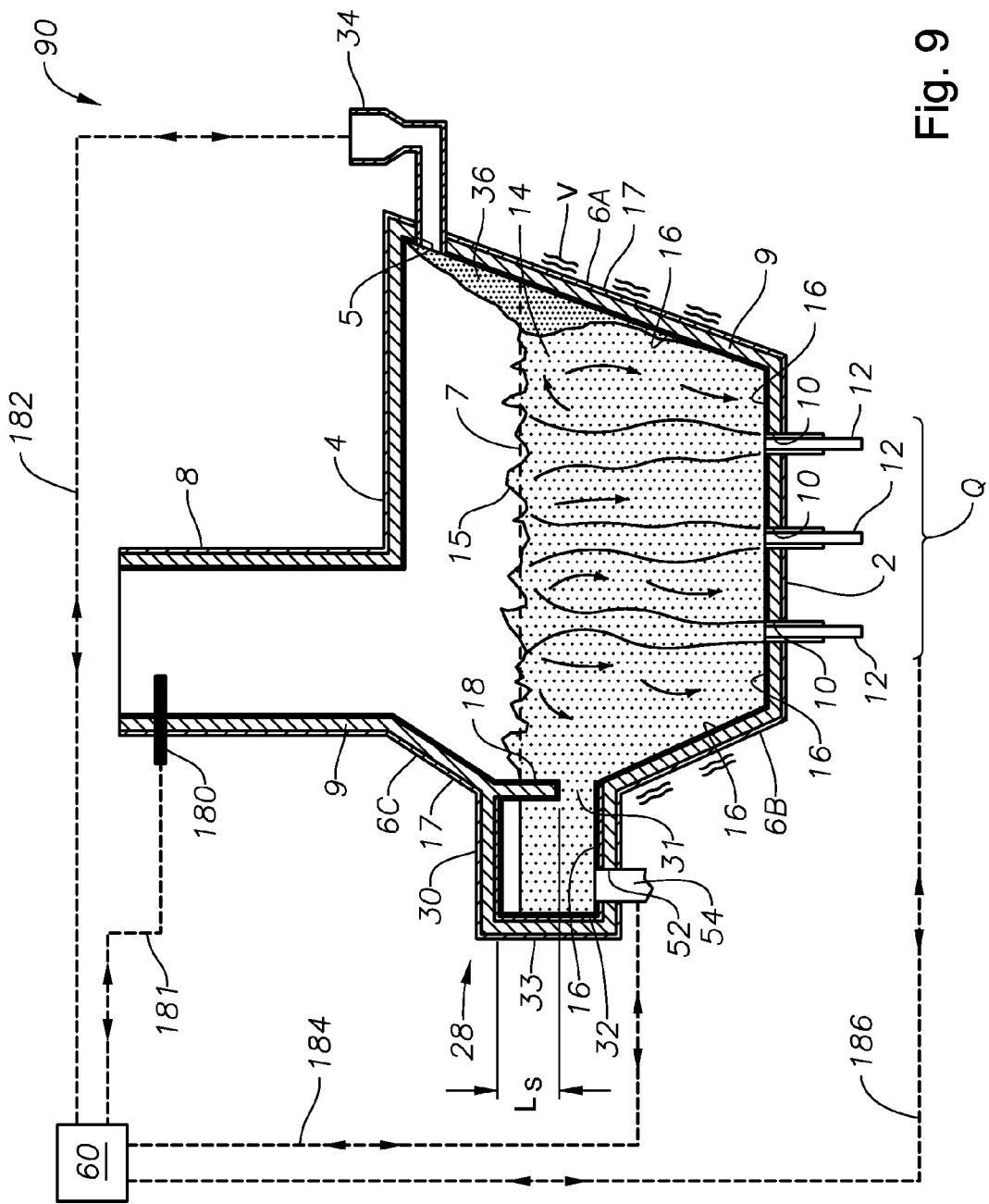

System embodiment 90 illustrated in FIG. 9 is similar to embodiment 50 illustrated schematically in FIG. 6, except that controller 60 is adapted to implement a model predictive control (MPC) scheme for the melter. A model of the melter operation is developed, and this model used in the MPC control scheme. Controller 60 receives a plurality of signals, such as signal 181 indicative of exhaust temperature using one or more temperature sensors 180 in exhaust stack 8, signal 182 indicative of feed rate of feeder 34, signal 184 indicative of non-turbulent molten material discharge rate, and signal 186 indicative of heat input Q by burners 12. Signals 182, 184, and 186 are indicated as double-headed arrows since controller 60 may utilize those signals and return a control signal to the source of the original signal, based on a model developed from the inputs over a period of time, and corresponding measurements of melt temperature of the turbulent melt in the melter over the same time period.

MPC is an advanced multivariable control method for use in multiple input/multiple output (MIMO) systems. An overview of industrial Model Predictive Control can be found on the Internet. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present disclosure it may be necessary to use nonlinear MPC. In so-called advanced control of various systems, proportional-integral-derivative (PID) control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC. A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Techniques discussed in Muijsenberg, et al., "An Advanced Control System to Increase Glass Quality and Glass Production Yields Based on GS ESLLI Technology" 66th Conference on Glass Problems: Ceramic Engineering and Science Proceedings, Volume 27, Issue 1, Chapter 3, published online 26 Mar. 2008, may be adapted to submerged combustion. As noted by the authors, in the context of conventional (non-submerged combustion) glass furnaces, when the glass production needs to produce products of consistent excellent glass quality at high yield and low energy usage, it is almost impossible to control the production manually. Therefore a group of advanced control techniques was developed for an automatic control. Correct usage of MPC together with knowledge of glass production may result in submerged combustion process stabilization, increasing glass quality and energy savings. Glass Service B.V., a consulting company in the glass production field, has developed the software package known under the trade designation Expert System ES-III entirely determined for the control of a non-submerged combustion glass production process. It utilizes all advantages of MPC system plus a combination of fuzzy control and neural networks. Some of these advanced techniques used in ES-III for glass production optimal control are described in this paper. Recent development targets use of the CFD (Computer Flow Dynamics) of the glass furnace as part of the control strategy using GS Glass Furnace Model (GS GFM). However, all of these advanced control techniques were developed in context of relatively non-turbulent, conventional glass melters, where the problems attendant with turbulent SC melters are not of concern.

Figure 13:
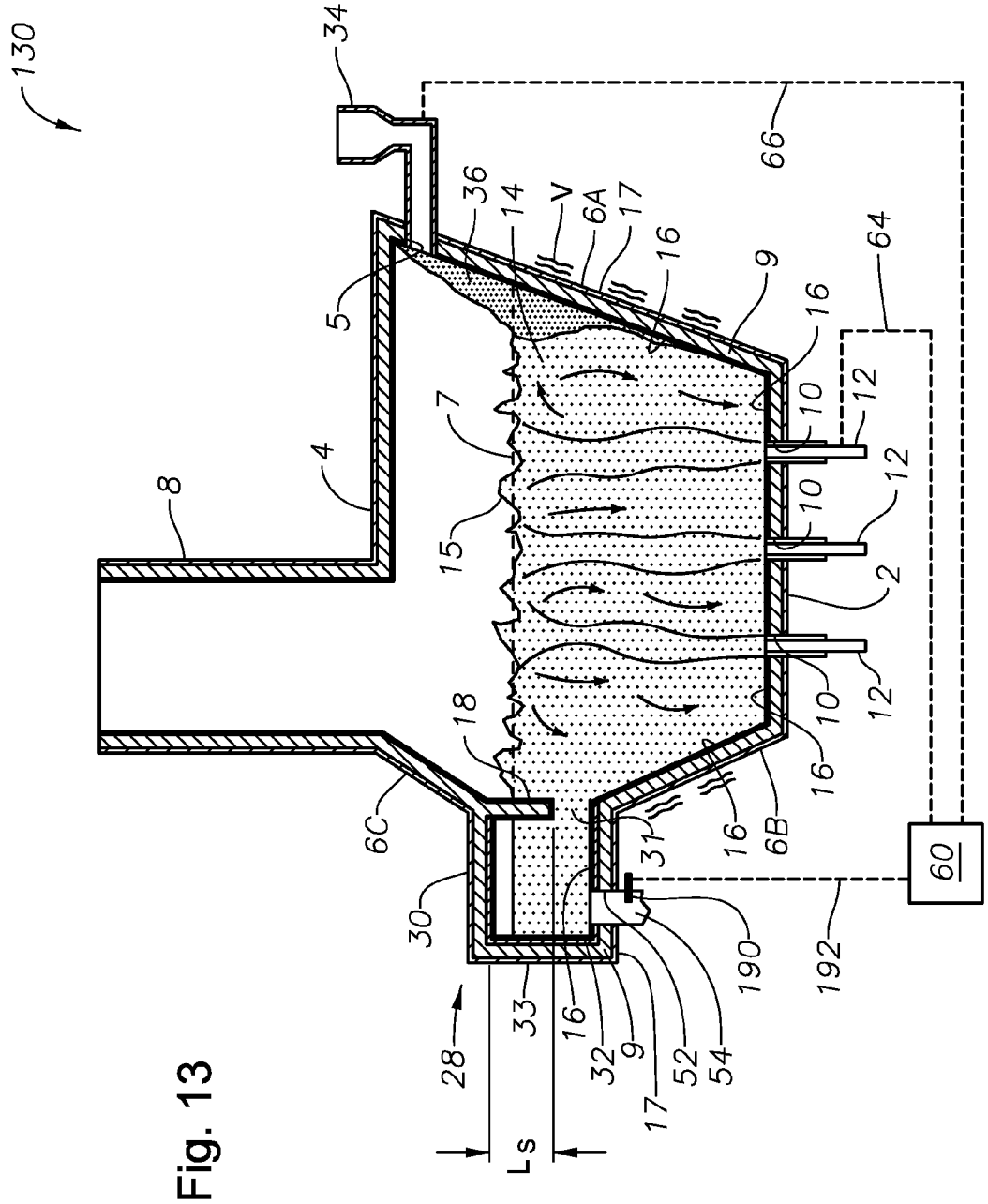

System embodiment 130 illustrated in FIG. 13 is similar to embodiment 90 illustrated schematically in FIG. 9, except that a different control scheme is employed. In embodiment 130, advantage is taken of the fact that flow of molten material out of the melter is non-turbulent, or at least much less turbulent than in the melting zone of the melter. Temperature of this less turbulent molten material is measured using a standard thermocouple or other immersed device 190, sending a signal 192 to controller 60, which then sends signal 64 to one or more burners 12 and adjusts the burners according, as well as signal 66 to feeder 34 to adjust feed rate.

FIG. 11 is a plan view of a sixth system embodiment 250 in accordance with the present disclosure. Illustrated schematically is a submerged combustion melter 1000 fluidly and mechanically connected to a first conditioning channel section 111 through an exit structure 114 and a transition section 116. Exit structure 114 may be, for example, but not limited to, a fluid-cooled exit structure as described in assignee's pending U.S. patent application Ser. No. 13/458,211, filed Apr. 27, 2012. First conditioning channel section 111 may comprise first and second subsections 118 and 120 in embodiment 250. First channel section 111 includes a roof and floor (both not illustrated in FIG. 1, but illustrated in FIG. 2), and a sidewall structure comprised of an outer metal shell 143, non-glass-contact brick or other refractory wall 44, and glass-contact refractory as further described in context of FIG. 2. First section 111 of embodiment 250 may be configured to promote a change of direction of flow of the molten mass of glass of 90 degrees in passing from first subsection 118 through second subsection 120. In various embodiments, the change of direction may vary from between about 30 degrees to about 90 degrees.

Still referring to FIG. 11, the conditioning channel of embodiment 250 may include several sections, for example a second section 122, third section 124, fourth section 126, and fifth section 128 arranged in series, each section having a roof, floor, and sidewall structure connecting its roof and floor, and defining a flow channel for conditioning molten glass flowing therethrough. Sections 122, 124, 126, and 128 may be divided by a series of skimmers, first skimmer 133, second skimmer 135, third skimmer 137, and fourth skimmer 139, each extending generally substantially vertically downward a portion of a distance between the roof and floor of the channel, with a final skimmer 141 positioned between fifth channel section 128 and a forehearth 149. The number of sections and the number of skimmers may each be more or less than five. Forehearth 149 may have one or more forming outlets denoted by dashed boxes 151, 153, on its underneath side, such as bushings, gob cutters, and the like, that are known in the art.

The conditioning channel of embodiment 250 may include one or more high momentum combustion burners, denoted strictly by position for clarity as solid darkened circles 147, positioned immediately upstream of each skimmer 133, 135, 137, 139, and 141 in the roof to burst at least some foamed material retained behind the skimmers and floating on top of a molten mass of glass flowing in the flow channel by heat and/or direct impingement thereon. As noted elsewhere herein, high momentum burners 147, also referred to as impingement burners, may alternately or additionally be positioned in section sidewall structures, or both in section roofs and section sidewall structures. In embodiment 250, a majority of high momentum combustion burners 147 are positioned along a centerline "CL" of the flow channel in the roof of each section, but this is not necessarily so in all embodiments, and embodiment 250 includes at least two high momentum burners 147 that are not so positioned in channel first subsection 118.

The conditioning channel of embodiment 250 may also include one or more low momentum combustion burners, denoted strictly by position for clarity as open circles 148, positioned immediately downstream of each skimmer 133, 135, 137, 139, and 141 in the roof of each section to transfer heat to the molten mass of glass without substantial interference from the foamed material. As noted elsewhere herein, low momentum burners 148, also referred to as non-impingement burners, may alternately or in addition be positioned in section sidewall structures, or both in section roofs and section sidewall structures. In embodiment 250, a majority of low momentum combustion burners 148 may be positioned along a centerline "CL" of the flow channel in the roof of each section, but this is not necessarily so in all embodiments, and embodiment 250 may include at least four low momentum burners 148 that are not so positioned in channel first subsection 118 and second subsection 120.

Referring again to FIG. 11, in embodiment 250 first subsection 118 has a flow channel $W_1$ width greater than a flow channel width $W_2$ of second subsection 120. In embodiment 250, each of the plurality of sections 22, 24, 26, and 28 may have a flow channel width $W_3$, $W_4$, $W_5$, $W_6$, wherein $W_3 > W_4 > W_5 > W_6$. If N represents the Nth flow channel section in the plurality of sections in certain embodiments $W_1 > W_2 > W_3 > W_N$, it is preferred that the flow channel width W be as wide as possible to promote long residence times for fining and large surface area for foam to collect (rise from within the molten glass and collect behind skimmers), however, this must be balanced against cost of constructing larger footprint apparatus and systems. Width W may range from about 100 inches (about 250 cm) near the SC melter, down to about 10 inches (about 25 cm) near the discharge from the last skimmer 40, or from about 90 inches (about 230 cm) near the SC melter down to about 12 inches (about 30 cm) near the discharge from skimmer 40.

In embodiment 250 skimmers may be separated along a longitudinal length of the flow channel by a separation distance "D" of at least about 5 feet (152 cm), wherein the separation distance may be the same or different from section to section. In certain embodiments "D" is greater than or equal to about 5 feet (152 cm) and less than or equal to about 15 feet (456 cm).

Figure 11A:
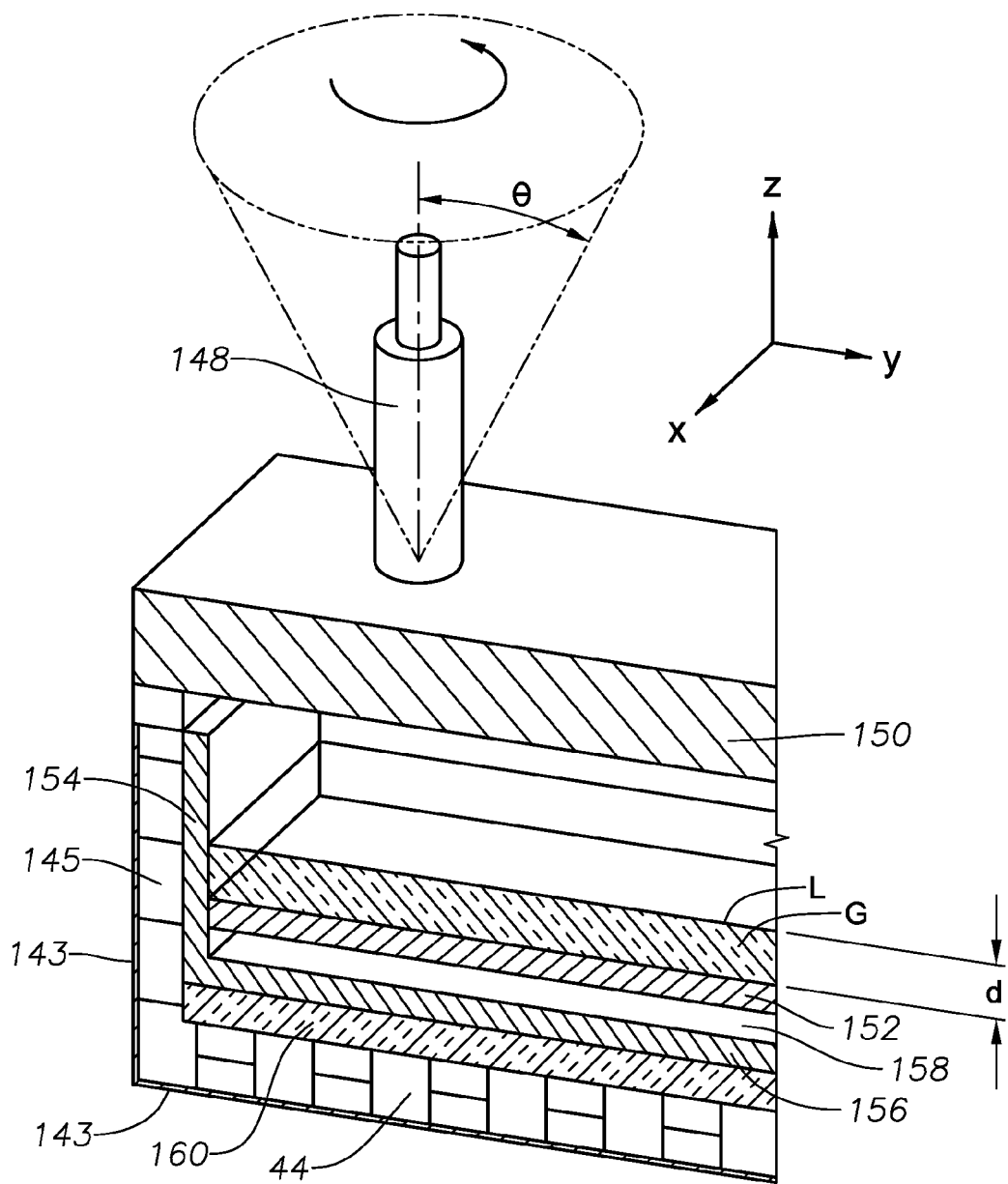

FIG. 11A is a schematic perspective, partial cross-sectional view along line A-A of embodiment 250 of FIG. 11, illustrating the sidewall structure of each section has sufficient glass-contact refractory 154 to accommodate the operating depth or level "L" of molten mass of glass "G", wherein it is understood that level L denotes only the general level of liquid molten glass, and not the foam floating or accumulating thereon. In certain embodiments, sidewall 145 includes glass-contact refractory 154 able to accommodate molten glass depth "d" of no greater than about 10 inches (25.4 cm), in certain other embodiments no greater than about 5 inches (12.7 cm). As illustrated schematically in FIG. 11A, the floor of each section may comprise a metal shell 143, a non-glass contact brick layer 44, a non-glass contact refractory support or insulating layer 160, a lower glass-contact refractory layer 156, and an upper glass-contact refractory layer 152. In embodiment 250, layers 152 and 156 may define an open layer or cavity 158 for flow of a cooling (or heating) fluid, such as cooling (or heating) air. The thicknesses of materials or layers 143, 44, 145, 150, 152, 154, 156, 158 and 160 depend on many factors, including the type of glass being produced, the material properties of the materials themselves, temperature and temperature homogeneity of molten glass desired or targeted, and the like.

Referring again to FIG. 11A, illustrated schematically is a low momentum burner 148, illustrating that burners 148 and/or 147 may be adjusted or positioned to direct their flames and/or combustion products in a variety of directions, denoted generally by a cone angle θ, which may vary from 0 to about 45 degrees, in any direction from 0 to 360 degrees about the z-axis as denoted by the circular arrow about the longitudinal centerline of burner 48 (an x-y-z set of coordinate axis is provided for reference).

In embodiment 250, advantage is also taken of the fact that flow of molten material in conditioning channels and forehearths is generally non-turbulent, or at least much less turbulent than in the melting zone of submerged combustion melter 1000. Temperatures of this less turbulent molten material may be measured using one or more standard thermocouples or other immersed devices 155, 157, 159, and 169, sending one or more signals 161, 163, 165, and 171, respectively to controller 60, which may then send a signal 167 to one or more burners and adjusts the burners according, and/or a signal to the feeder to adjust feed rate (not shown).

Figure 7:
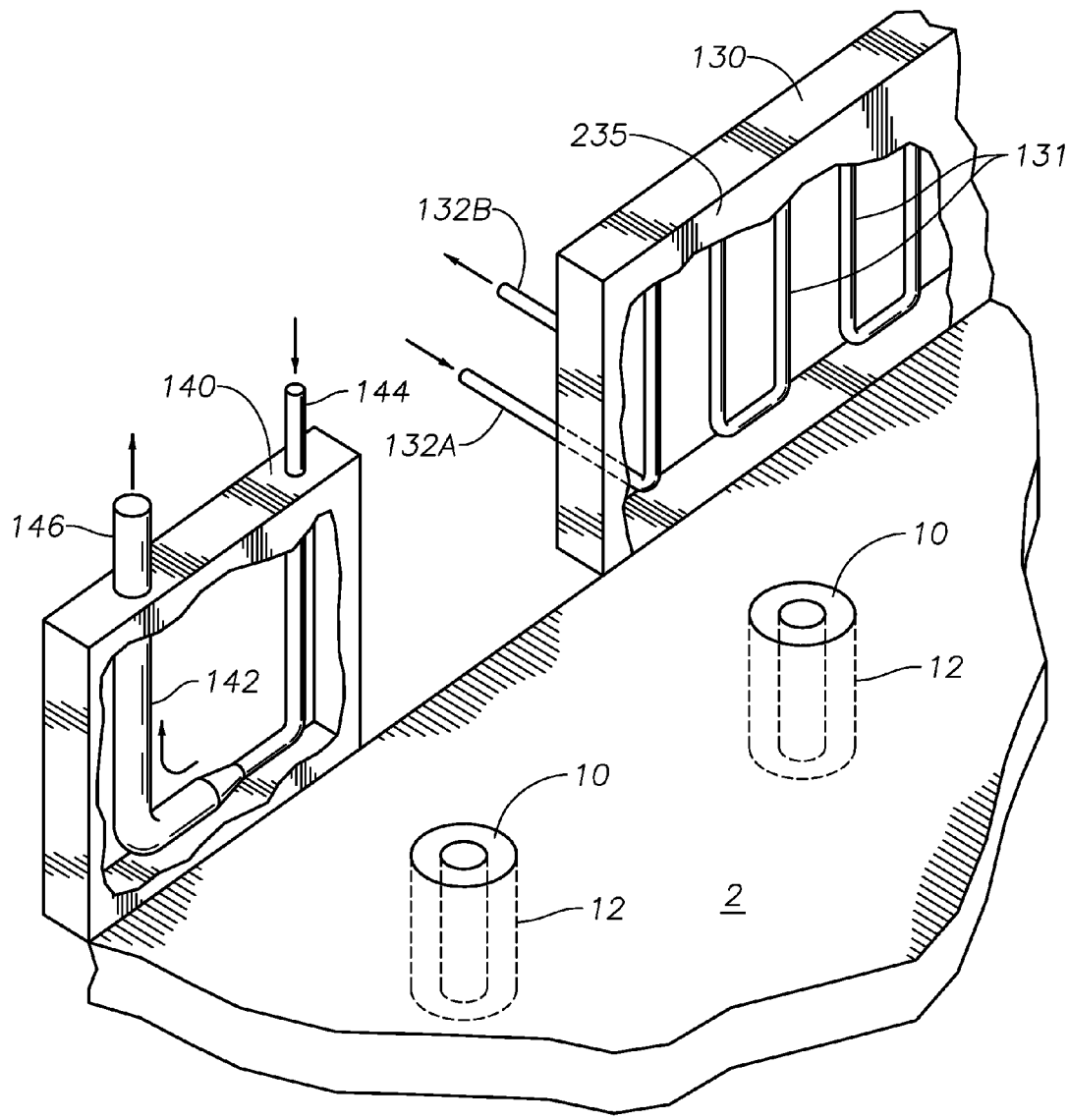
FIG. 7 is a perspective view, partially in cross-section, of a fluid-cooled panel useful in certain system and process embodiments of the present disclosure.

FIG. 7 is a perspective view of a portion of a melter, melter exit structure, skimmer, or dam illustrating two embodiments of fluid-cooled panels useful in processes and systems of the present disclosure. Also illustrated in FIG. 7 is a portion of melter floor 2, and two floor-mounted burners 12 illustrated in phantom as they are beneath floor 2, flush with openings 10 in floor 2 in this embodiment. A first cooled-panel 130 is liquid-cooled, having one or more conduits or tubing 131 therein, supplied with liquid through conduit 132A, with another conduit 132B discharging warmed liquid, routing heat transferred from inside the melter (or other component being cooled) to the liquid away from the melter or other component. Liquid-cooled panel 130 as illustrated also includes a thin refractory liner 235, which minimizes heat losses from the melter or other component, but allows formation of a thin frozen and/or highly viscous glass shell to form on the surfaces and prevent any refractory wear and associated glass contamination. Another cooled panel 140 is illustrated, in this case an air-cooled panel, comprising a conduit 142 that has a first, small diameter section 144, and a large diameter section 146. Warmed air transverses conduit 142 in the direction of the curved arrow. Conduit section 146 is larger in diameter to accommodate expansion of the air as it warms. Air-cooled panels such as illustrated in FIG. 7 are described more fully in U.S. Pat. No. 6,244,197.

Figure 3:
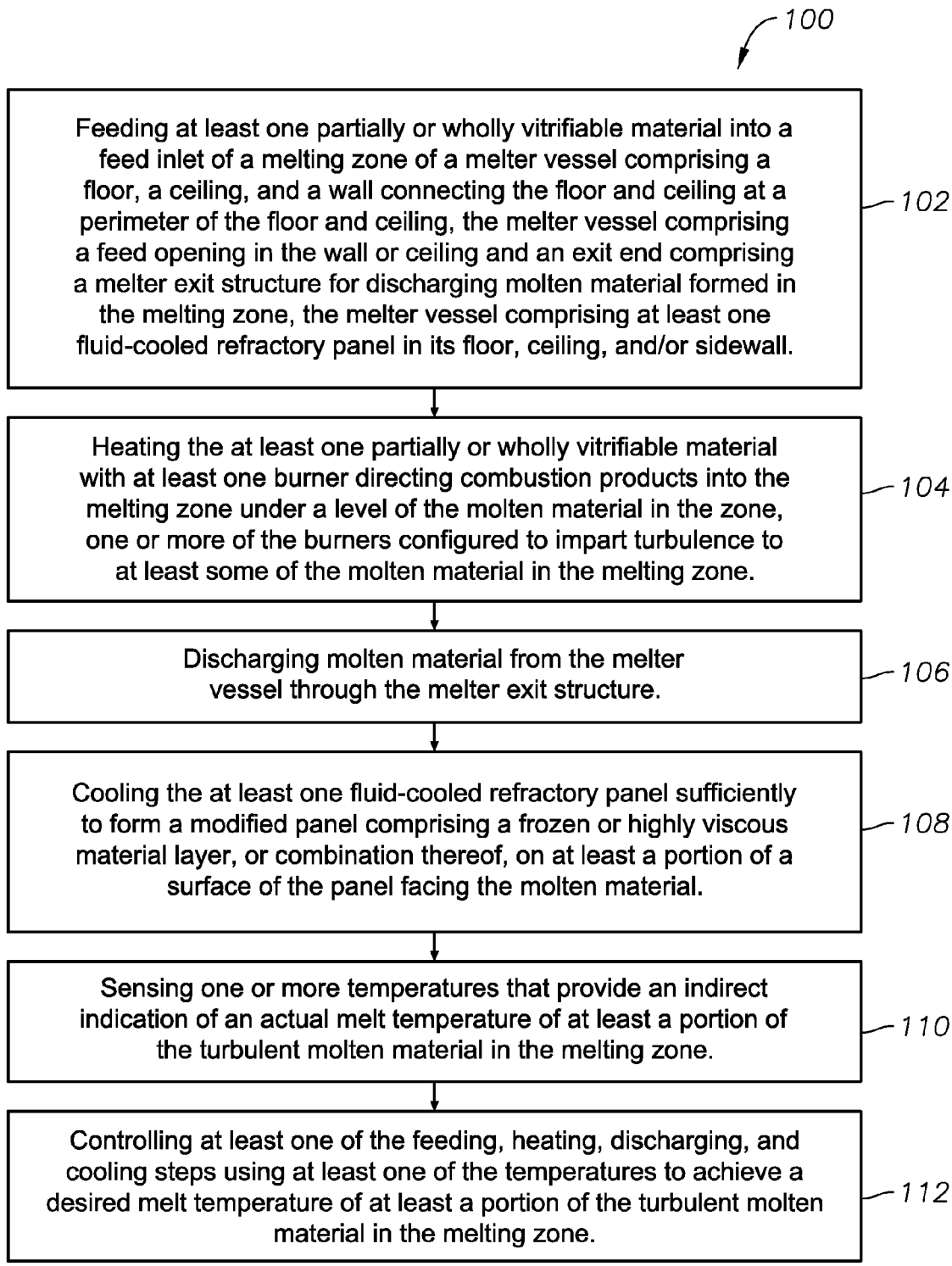
FIGS. 3, 5, 8, 10, 12, 14, and 15 are logic diagrams illustrating processes in accordance with the present disclosure.

FIGS. 3, 5, 8, 10, 12, 14, and 15 are logic diagrams illustrating processes in accordance with the present disclosure, with FIG. 3 illustrating logically a general process, and FIGS. 5, 8, 10, 12, 14, and 15 corresponding to the system embodiments illustrated schematically in FIGS. 1, 4, 6, 9, 11, and 13, respectively. It should be emphasized that all steps of the various process embodiments need not be carried out in series or succession. Embodiment 100 of FIG. 3 includes the steps of feeding at least one partially or wholly vitrifiable material into a feed inlet of a melting zone of a melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in the melting zone, the melter vessel comprising at least one fluid-cooled refractory panel in its floor, ceiling, and/or sidewall (box 102); heating the at least one partially or wholly vitrifiable material with at least one burner directing combustion products into the melting zone under a level of the molten material in the zone, one or more of the burners configured to impart turbulence to at least some of the molten material in the melting zone (box 104); discharging molten material from the melter vessel through the melter exit structure (box 106); cooling the at least one fluid-cooled refractory panel sufficiently to form a modified panel comprising a frozen or highly viscous material layer, or combination thereof, on at least a portion of a surface of the panel facing the molten material (box 108); sensing one or more temperatures that provide an indirect indication of an actual melt temperature of at least a portion of the turbulent molten material in the melting zone (box 110); and controlling at least one of the feeding, heating, cooling, and discharging steps using at least one of the sensed temperatures to achieve a desired melt temperature of at least a portion of the turbulent molten material in the melting zone.

Figure 5:
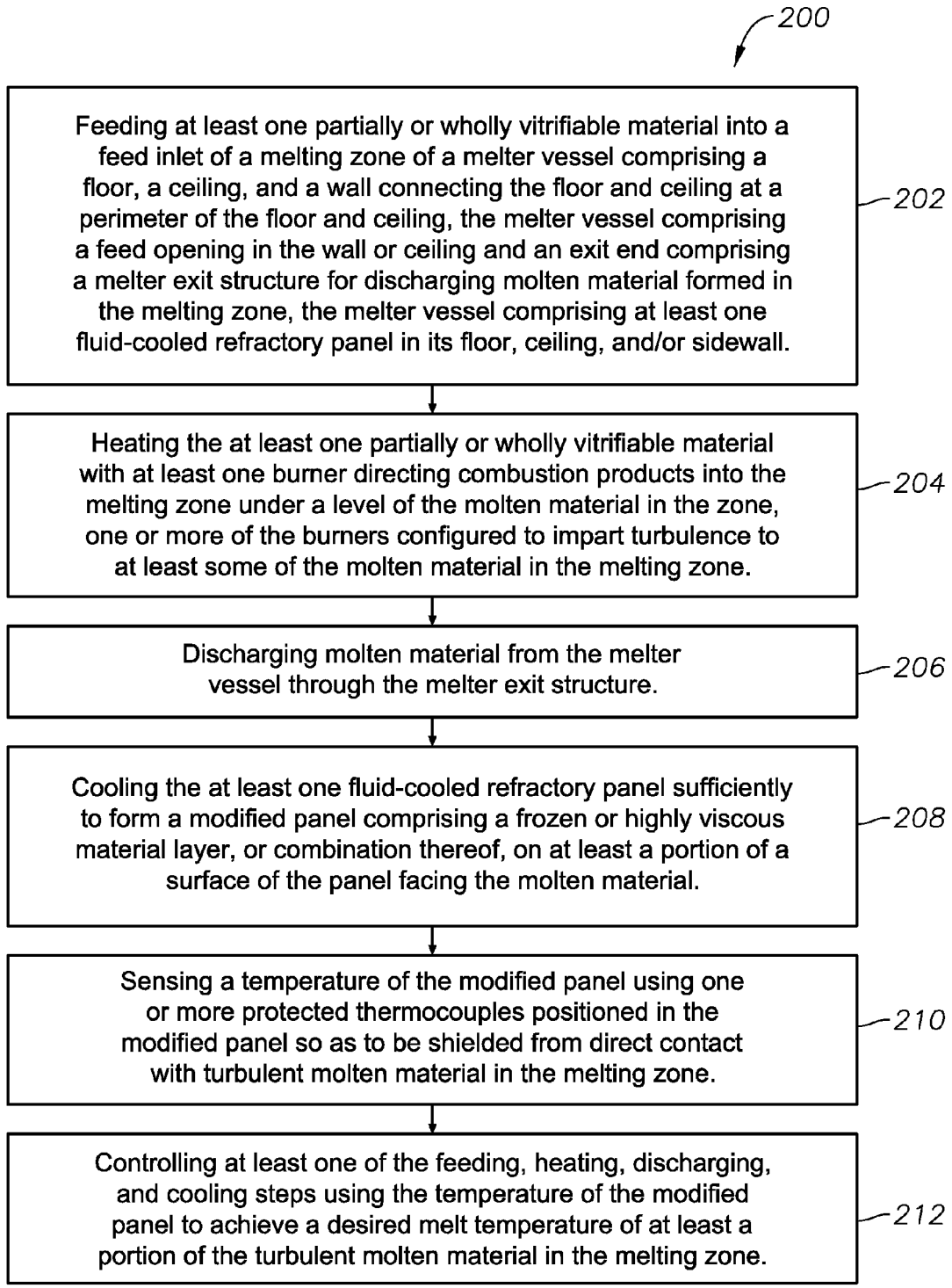

Process embodiment 200 illustrated in FIG. 5 includes the same feeding, heating, cooling, and discharging steps as embodiment 100, exemplified in boxes 202, 204, 206, and 208, but differs from embodiment 100 in including sensing a temperature of a modified panel (a fluid-cooled panel modified during operation to include a frozen and/or highly viscous material layer) using one or more protected thermocouples positioned in the modified panel so as to be shielded from direct contact with turbulent molten material in the melting zone (box 210), and controlling at least one of the feeding, heating, discharging, and cooling steps using the temperature of the modified panel to achieve a desired melt temperature of at least a portion of the turbulent molten material in the melting zone (box 212).

Figure 8:
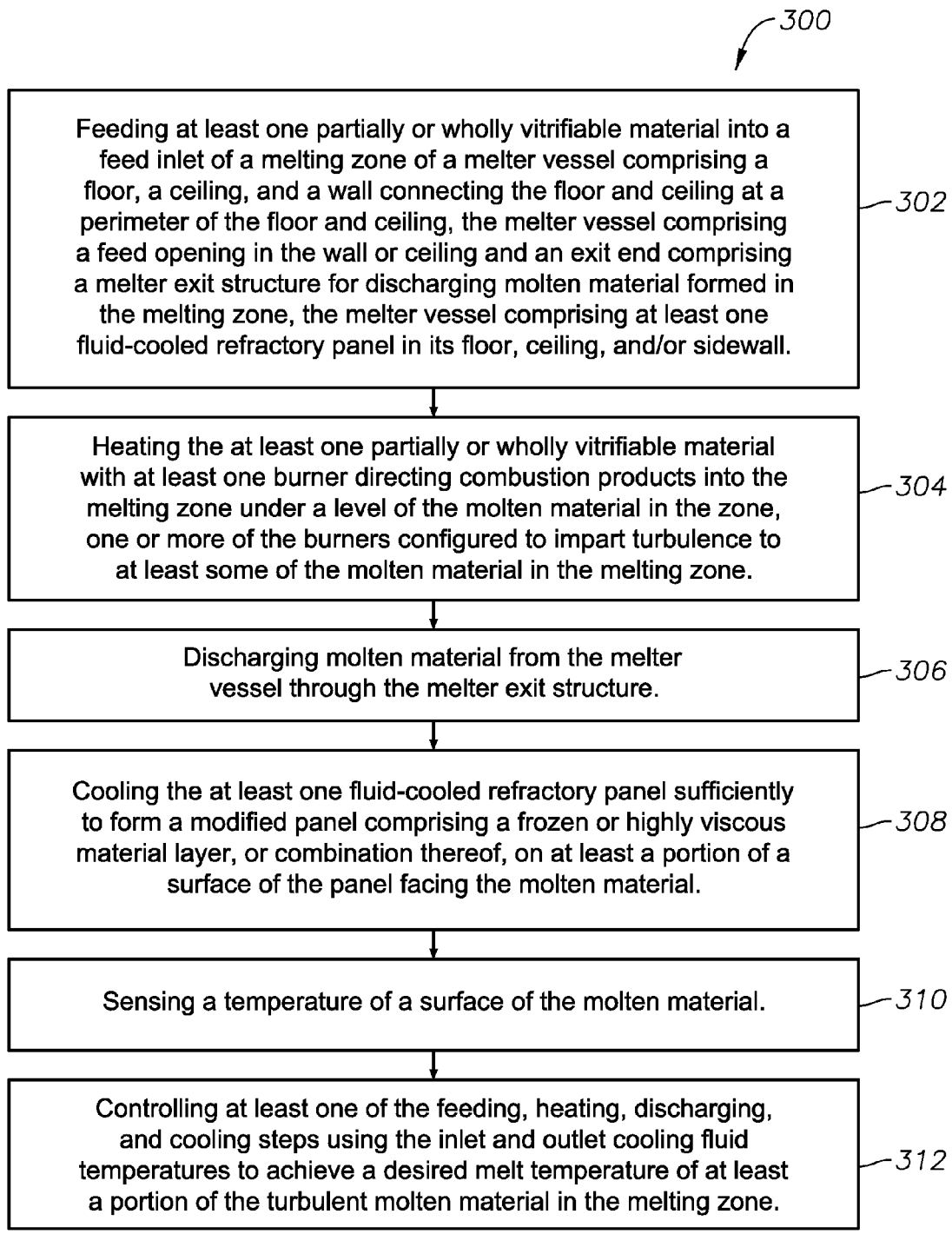

Process embodiment 300 illustrated in FIG. 8 includes the same feeding, heating, cooling, and discharging steps as embodiment 100, exemplified in boxes 302, 304, 306, and 308, but differs from embodiment 100 in including sensing a temperature of a surface of the molten material, for example using an optical temperature measuring device (box 310), and controlling at least one of the feeding, heating, discharging, and cooling steps using the surface temperature of the molten material to achieve a desired melt temperature of at least a portion of the turbulent molten material in the melting zone (box 312).

Figure 10:
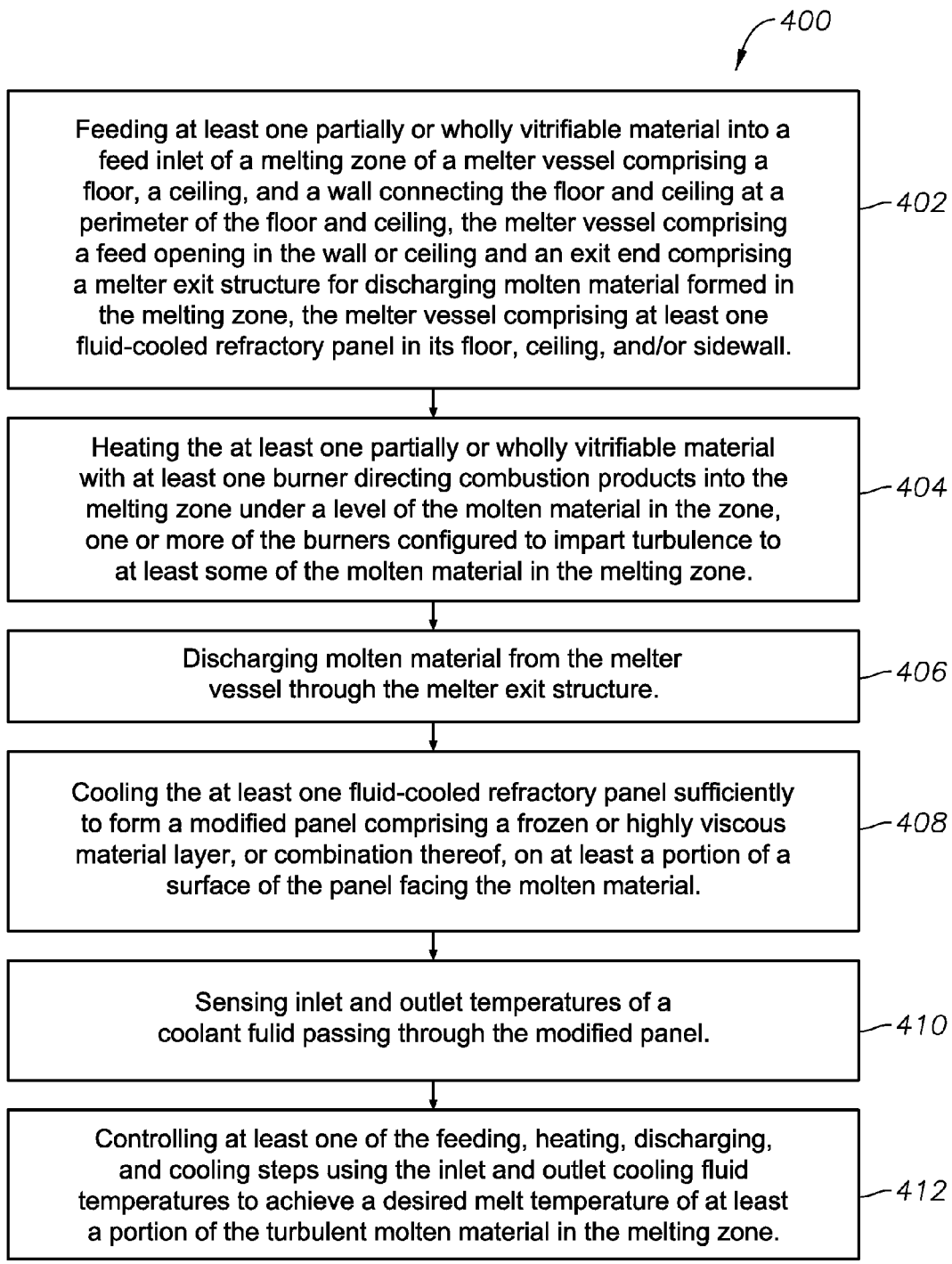

Process embodiment 400 illustrated in FIG. 10 includes the same feeding, heating, cooling, and discharging steps as embodiment 100, exemplified in boxes 402, 404, 406, and 408, but differs from embodiment 100 in including sensing inlet and outlet temperatures of a coolant fluid passing through a modified fluid-cooled panel (box 410), and controlling at least one of the feeding, heating, discharging, and cooling steps using the inlet and outlet cooling fluid temperatures to achieve a desired melt temperature of at least a portion of the turbulent molten material in the melting zone (box 412).

Figure 12:
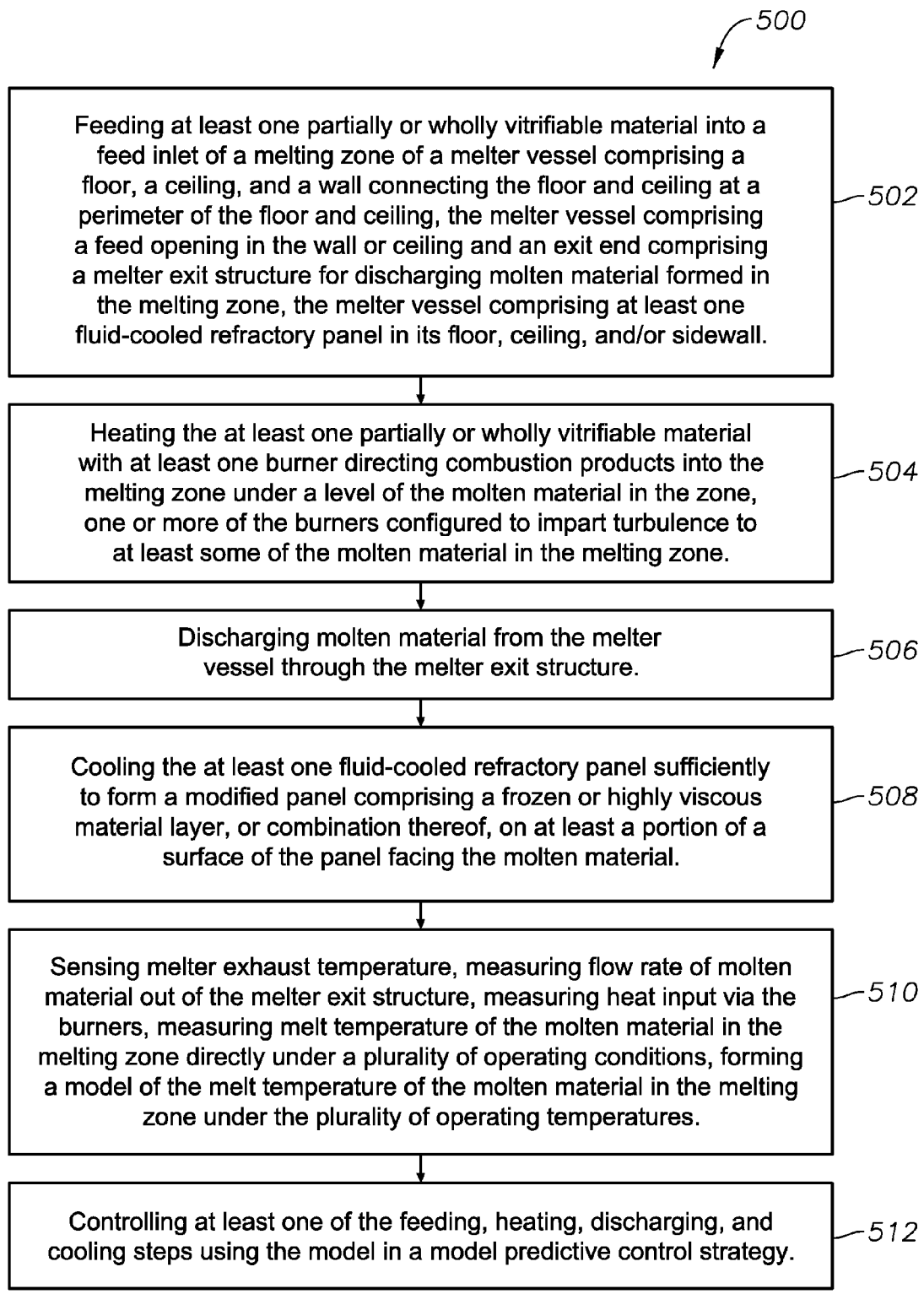

Process embodiment 500 illustrated in FIG. 12 includes the same feeding, heating, cooling, and discharging steps as embodiment 100, exemplified in boxes 502, 504, 506, and 508, but differs from embodiment 100 in including sensing melter exhaust temperature, measuring flow rate of molten material out of the melter exit structure, measuring heat input via the burners, measuring melt temperature of the molten material in the melting zone directly under a plurality of operating conditions, and forming a model of the melt temperature of the molten material in the melting zone under the plurality of operating temperatures (box 510), and controlling at least one of the feeding, heating, discharging, and cooling steps using the model in a model predictive control strategy (box 512).

Figure 14:
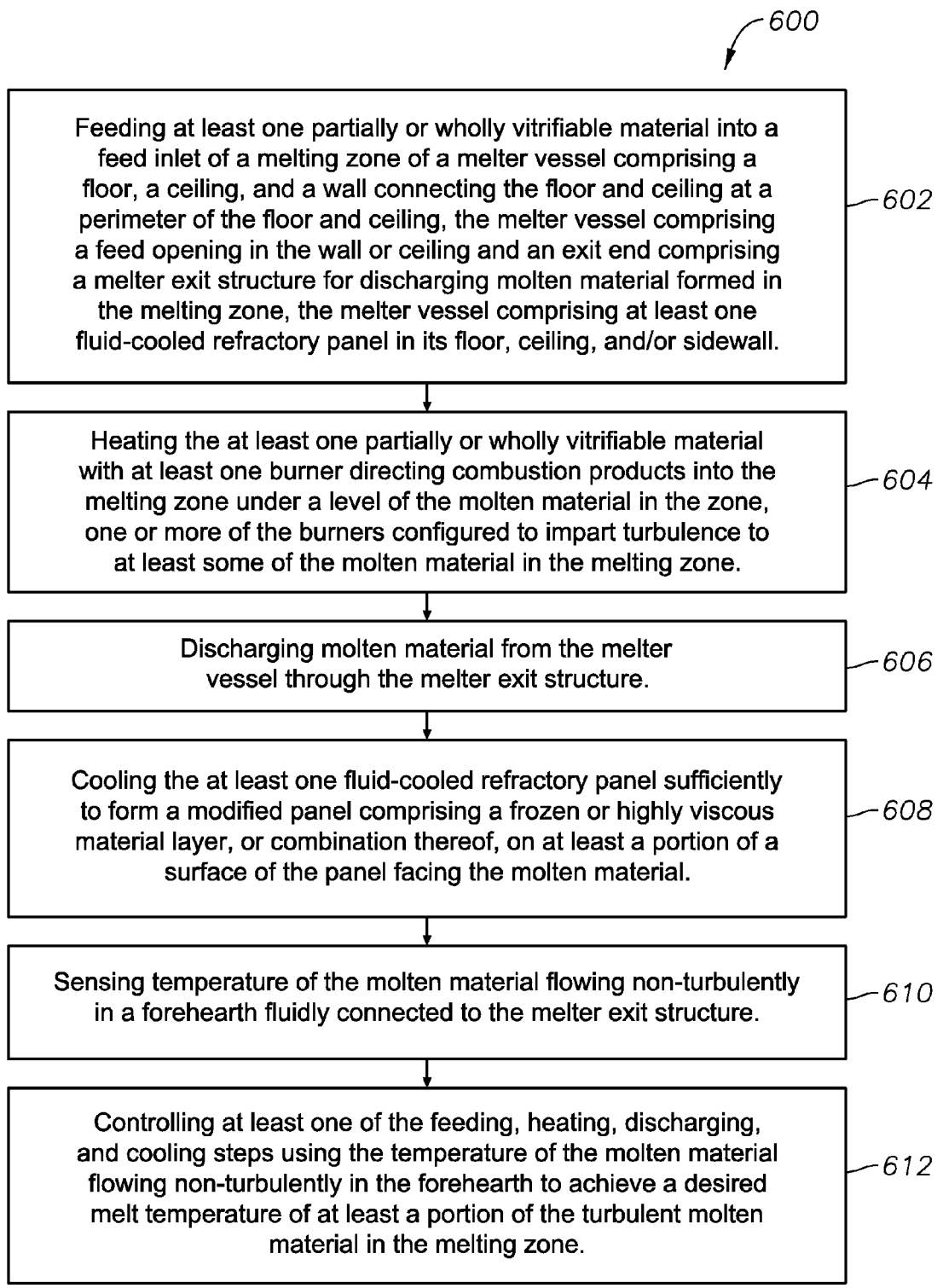

Process embodiment 600 illustrated in FIG. 14 includes the same feeding, heating, cooling, and discharging steps as embodiment 100, exemplified in boxes 602, 604, 606, and 608, but differs from embodiment 100 in including sensing temperature of the molten material flowing non-turbulently in a forehearth fluidly connected to the melter exit structure (box 610), and controlling at least one of the feeding, heating, discharging, and cooling steps using the temperature of the molten material flowing non-turbulently in the forehearth to achieve a desired melt temperature of at least a portion of the turbulent molten material in the melting zone (box 612).

Figure 15:
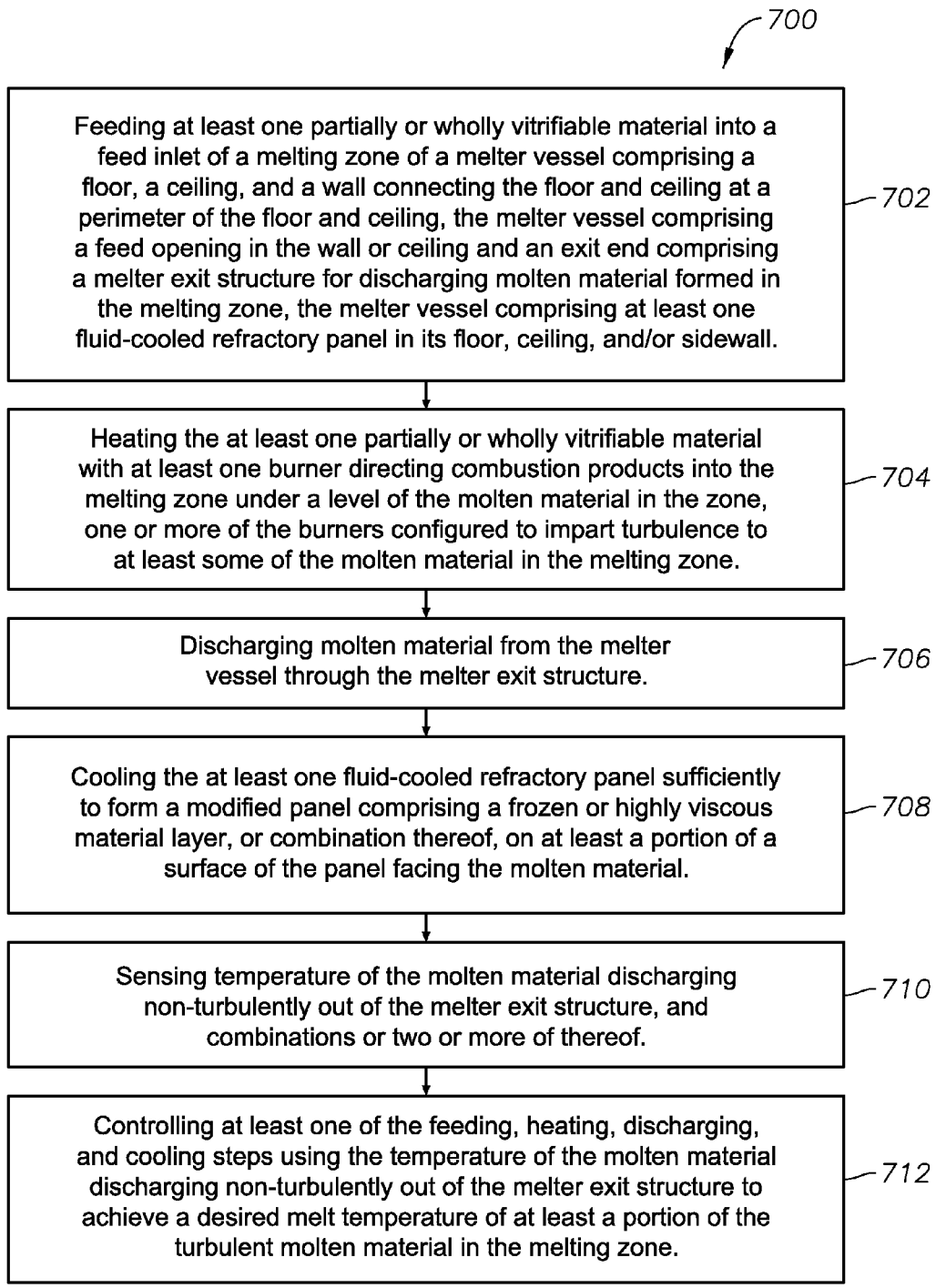

Process embodiment 700 illustrated in FIG. 15 includes the same feeding, heating, cooling, and discharging steps as embodiment 100, exemplified in boxes 702, 704, 706, and 708, but differs from embodiment 100 in including sensing temperature of the molten material discharging non-turbulently out of the melter exit structure, and combinations of two or more thereof (box 710), and controlling at least one of the feeding, heating, discharging, and cooling steps using the temperature of the molten material discharging non-turbulently out of the melter exit structure to achieve a desired melt temperature of at least a portion of the turbulent molten material in the melting zone (box 712).

In operation of systems of this disclosure, feed material, such as E-glass batch (melts at about 1400° C.), insulation glass batch (melts at about 1200° C.), or scrap in the form of glass fiber mat and/or insulation having high organic binder content, glass cullet, and the like, is fed to the melter through a feeder 34 and melter inlet 5. One or more submerged combustion burners 12 are fired to melt the feed materials and to maintain a turbulent molten glass melt 14. Molten glass moves toward melter exit structure 28, and is discharged from the melter. Combustion product gases (flue gases) exit through stack 8, or may be routed to heat recovery apparatus, as discussed herein. If oxy-fuel combustion is employed in some or all burners 12, the general principle is to operate combustion in the burners in a manner that replaces some of the air with a separate source of oxygen. The overall combustion ratio may not change. Importantly, the throughput of melter apparatus described in the present disclosure may be 2 $ft^2$ per short ton per day (2 $ft^2$/stpd) or less, and in some embodiments 0.5 $ft^2$/stpd or less. This is at least twice, in certain embodiments ten times the throughput of conventional melter apparatus.

An advanced temperature measurement system was developed for conventional glass furnaces including "self-verifying temperature sensors", such as disclosed in U.S. Pat. Nos. 5,713,668 and 5,887,978. It is contemplated that these temperature sensors may be used in embodiments of the present disclosure.

Controller 60 may be a master controller, but the systems and processes described herein are not so limited, as any combination of controllers could be used. Controller 60 may be selected from PI controllers, PID controllers (including any known or reasonably foreseeable variations of these), and may compute a residual equal to a difference between a measured value and a set point to produce an output to one or more control elements. Controller 60 may compute the residual continuously or non-continuously. Other possible implementations of the systems and processes of the present disclosure are those wherein controller 60 may comprise more specialized control strategies, such as strategies selected from feed forward, cascade control, internal feedback loops, model predictive control, neural networks, and Kalman filtering techniques. Controller 60 may receive input signals from, and provide output signals for, for example, but not limited to, the following parameters: velocity of fuel entering a burner; velocity of primary oxidant entering a burner; velocity of secondary oxidant entering a burner; mass flow rate of fuel entering a burner; mass flow rate of primary oxidant entering a burner; temperature of fuel entering a burner; temperature of primary oxidant entering a burner; pressure of primary oxidant entering a burner; humidity of primary oxidant; feed rate of material into the melter, flow rate of molten material out of the melter, mass flow rate of hot effluent exhaust, mass flow rates of input and output heat transfer fluids for fluid-cooled panels, and the like. Burner geometry and combustion ratio are other examples of input signals.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the invention.

Melter apparatus described in accordance with the present disclosure may be constructed using only fluid-cooled refractory panels, with or without a thin refractory "glass-contact" liner, as discussed herein. The thin refractory liner may be 1 centimeter, 2 centimeters, 3 centimeters or more in thickness, however, greater thickness may entail more expense without resultant greater benefit. The refractory liner may be one or multiple layers. Alternatively, melters described herein may be constructed using cast concretes such as disclosed in U.S. Pat. No. 4,323,718. The thin refractory linings discussed herein may comprise materials described in the 718 patent, which is incorporated herein by reference. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

Burners useful in the systems and processes described herein include those described in U.S. Pat. Nos. 4,539,034; 3,170,781; 3,237,929; 3,260,587; 3,606,825; 3,627,504; 3,738,792; 3,764,287; and 7,273,583, all of which are incorporated herein by reference in their entirety. One useful burner, for example, is described in the 583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. In one embodiment, the burners described in the 583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

Melter apparatus useful in systems and processes in accordance with the present disclosure may also comprise one or more wall-mounted submerged combustion burners, and/or one or more roof-mounted burners. Roof-mounted burners may be useful to pre-heat the melter apparatus melting zone 14 and may serve as ignition sources for one or more submerged combustion burners 12. Melter apparatus having only wall-mounted submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners 12. In certain embodiments, if there is a possibility of carryover of batch particles to the exhaust, one or more roof-mounted burners could be used to form a curtain to prevent particulate carryover. In certain embodiments, all submerged combustion burners 12 are oxy-fuel burners (where "oxy" means oxygen, or oxygen-enriched air, as described earlier), but this is not necessarily so in all embodiments; some or all of the submerged combustion burners may be air-fuel burners. Furthermore, heating may be supplemented by electrical heating in certain embodiments, in certain melter zones.

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2, inclusive of the end numbers, and possibly higher or lower in certain embodiments. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel in the various submerged combustion burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired, and/or the degree of turbulence may so great as to be detrimental to refractory, or other materials of construction. High turbulence may also produce an undesired amount of foam or bubbles in the melt that cannot be refined out of the melt if the conditioning facilities are not adequate.

High momentum burners useful in systems and processes such as illustrated in FIG. 11 include those disclosed assignee's U.S. patent application Ser. No. 13/268,130, filed Oct. 7, 2011, which include an oxidant conduit and an inner concentric fuel conduit. Oxidant and fuel supplies for these burners may quick connect/disconnect features, allowing a hose of other source of fuel to be quickly attached to and detached from the conduits. For example, high momentum burner embodiments may comprise a nominal ¼-inch stainless steel Schedule 40 pipe for the fuel conduit and a nominal ¾-inch stainless steel Schedule 40 pipe for the oxidant conduit. Nominal ¼-inch Schedule 40 pipe has an external diameter of 0.54 inch (1.37 cm) and an internal diameter of 0.36 inch (0.91 cm), while nominal ¾-inch Schedule 40 pipe has an external diameter of 1.05 inch (2.67 cm) and internal diameter of 0.82 inch (2.08 cm). The selection of conduit schedule dictates the annular distance between the OD of the inner fuel conduit and the internal diameter (ID) of the oxidant conduit. These dimensions are merely examples, as any arrangement that produces the desired momentum and/or heat will be suitable, and within the skills of the skilled artisan in possession of this disclosure. High momentum burners may be fluid-cooled by employing a third concentric conduit creating an annular region between the oxidant conduit and third conduit.

For high momentum burners burning natural gas, the burners may have a fuel firing rate ranging from about 10 to about 1000 scfh (from about 280 L/hr. to about 28,000 L/hr.); an oxygen firing rate ranging from about 15 to about 2500 scfh (from about 420 L/hr. to about 71,000 L/hr.); a combustion ratio ranging from about 1.5 to about 2.5; nozzle velocity ratio (ratio of velocity of fuel to oxygen at the fuel nozzle tip) ranging from about 0.5 to about 2.5; fuel gas velocity ranging from about 150 to about 1000 ft./sec (from about 46 m/sec to about 300 m/sec); and oxygen velocity ranging from about 150 to about 1000 ft./sec (from about 46 m/sec to about 300 m/sec). Of course these numbers depend on the heating value of the fuel, amount of oxygen in the "oxygen" stream, temperatures and pressures of the fuel and oxidant, and the like, among other parameters. In one typical operation, the high momentum burner would have a combustion ratio of 2.05:1; a velocity ratio of 1; firing rate of natural gas of 500 scfh (14,000 L·hr.) and 1075 scfh (30,400 L/hr.) oxygen; natural gas and oxygen velocities each of 270 ft./sec (80 m/sec); natural gas pressure of 1 psig (6.9 KPa); and oxygen pressure of 0.6 psig (4.1 Kpa), pressures measured at the entrance to the combustion chamber.

Low momentum burners useful in apparatus, systems, and methods of this disclosure may include some of the features of those disclosed in assignee's U.S. patent application Ser. No. 13/268,130, filed Oct. 7, 2011.

For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

In certain embodiments of the disclosure it may be desired to implement heat recovery. In embodiments of the disclosure employing a heat transfer fluid for heat recovery, it is possible for a hot intermediate heat transfer fluid to transfer heat to the oxidant or the fuel of submerged combustion burners either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated. Furthermore, the intermediate fluid could be heated by the hot flue gases by either of the two mechanisms just mentioned.

In certain embodiments employing heat recovery, the primary means for transferring heat may comprise one or more heat exchangers selected from the group consisting of ceramic heat exchangers, known in the industry as ceramic recuperators, and metallic heat exchangers further referred to as metallic recuperators. Apparatus and methods in accordance with the present disclosure include those wherein the primary means for transferring heat are double shell radiation recuperators. Preheater means useful in apparatus and methods described herein may comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

Submerged combustion burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary apparatus and methods of the disclosure comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

The burners used for submerged combustion may provide an amount of heat which is effective to melt the initial raw material to form the molten material 14, and to maintain the molten material 14 in its molten state. The optimal temperature for melting the initial raw material and maintaining the molten material 14 in its molten state can depend on, for example, the composition of the initial raw material and the rate at which the molten material 14 is removed from the melter apparatus. For example, the maximum temperature in the melter apparatus can be at least about 1400° C., preferably from about 1400° C. to about 1650° C. The temperature of the molten material 14 can be from about 1050° C. to about 1450° C.; however, systems and processes of the present disclosure are not limited to operation within the above temperature ranges. The molten material 14 removed from the melter apparatus is typically a substantially homogeneous composition, but is not limited thereto.

In certain embodiments the sensing of one or more temperatures that provide an indirect indication is selected from the group consisting of sensing a temperature of the modified panel, sensing a temperature of a surface of the molten material, sensing inlet and outlet temperatures of a coolant fluid passing through the modified panel, sensing melter exhaust temperature, sensing temperature of the molten material flowing non-turbulently in a forehearth fluidly connected to the melter exit structure, sensing temperature of the molten material discharging non-turbulently out of the melter exit structure, and combinations or two or more of thereof.

In certain embodiments the sensing a temperature of the modified panel comprises using one or more protected thermocouples positioned in the modified panel so as to be shielded from direct contact with turbulent molten material in the melting zone, wherein the turbulence imparted by one or more of the burners is sufficient to cause an unprotected thermocouple having construction similar to the protected thermocouple and positioned in the molten material to fail.

In certain embodiments the melter vessel comprises comprising a fluid-cooled skimmer configured to form a frozen or highly viscous material layer, or combination thereof, on outer surfaces thereof contacting the molten material, forming a modified skimmer, the modified skimmer extending downward from the ceiling of the melter vessel and positioned upstream of the melter exit structure, the modified skimmer having a lower distal end defining a top of a throat of the melter vessel, the throat controlling the discharge of molten material from the melter vessel, the process comprising sensing a temperature of the modified skimmer using a second protected thermocouple positioned in the modified skimmer so as to be shielded from direct contact with molten material passing through the throat.

In certain embodiments the melter exit structure comprises a fluid-cooled panel configured to form a frozen or highly viscous material layer, or combination thereof, on an inner surface thereof facing the molten material, forming a modified melter exit structure, the process comprising sensing a temperature of the modified melter exit structure using a second protected thermocouple positioned in the modified melter exit structure so as to be shielded from direct contact with molten material passing through the modified exit structure.

In certain process embodiments, the process comprises obtaining one or more optical temperature measurements of the molten material in the melter vessel, calculating a degree of correlation between the one or more sensed temperatures and the one or more optical temperature measurements, and using the degree of correlation in the controlling of the at least one of steps (a)-(d). In certain embodiments the sensing a temperature of a surface of the molten material comprises sensing the temperature through an exhaust port of the melter vessel. In certain embodiments the sensing a temperature of a surface of the molten material comprises sensing the temperature through a view port of the melter vessel. In certain the sensing a temperature of a surface of the molten material comprises sensing the temperature through the feed opening of the melter vessel.

In certain embodiments, the process comprises sensing the exhaust temperature, measuring flow rate of molten material out of the melter exit structure, measuring heat input via the burners, measuring melt temperature of the molten material in the melting zone directly under a plurality of operating conditions, forming a model of the melt temperature of the molten material in the melting zone under the plurality of operating temperatures, controlling at least one of steps (a)-(d) using the model in a model predictive control strategy.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A process comprising:
   a) feeding at least one partially or wholly vitrifiable material into a feed inlet of a melting zone of a melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in the melting zone, the melter vessel comprising at least one fluid-cooled refractory panel in its floor, ceiling, and/or sidewall;
   b) heating the at least one partially or wholly vitrifiable material with at least one burner directing combustion products into the melting zone under a level of the molten material in the zone, one or more of the burners configured to impart turbulence to at least some of the molten material in the melting zone;
   c) discharging molten material from the melter vessel through the melter exit structure;
   d) cooling the at least one fluid-cooled refractory panel sufficiently to form a modified panel comprising a frozen or highly viscous material layer, or combination thereof, on at least a portion of a surface of the panel facing the molten material;
   e) sensing one or more temperatures of the modified panel that provide an indirect indication of an actual melt temperature of at least a portion of the turbulent molten material in the melting zone; and
   f) controlling at least one of steps (a)-(d) using at least one of the temperatures of step (e) to achieve a desired melt temperature of at least a portion of the turbulent molten material in the melting zone.

2. The process of claim 1 wherein the sensing a temperature of the modified panel comprises sensing temperature with one or more protected thermocouples positioned in the modified panel so as to be shielded from direct contact with turbulent molten material in the melting zone.

3. The process of claim 2 wherein the one or more protected thermocouple has a distal end buried in the refractory of the modified panel.

4. The process of claim 2 wherein the one or more protected thermocouple has a distal end positioned flush with the surface of the panel facing the molten material.

5. The process of claim 2 wherein the one or more protected thermocouple has a distal end buried in the frozen or highly viscous material layer of the modified panel.

6. The process of claim 2 wherein the sensing temperature of the modified panel comprises sensing temperature with a plurality of protected thermocouples positioned in the modified panel so as to be shielded from direct contact with turbulent molten material in the melting zone.

7. The process of claim 2 wherein the melter vessel comprises a fluid-cooled skimmer configured to form a frozen or highly viscous material layer, or combination thereof, on outer surfaces thereof contacting the molten material, the skimmer extending downward from the ceiling of the melter vessel and positioned upstream of the melter exit structure, the skimmer having a lower distal end defining a top of a throat of the melter vessel, the throat controlling the discharge of molten material from the melter vessel, the skimmer including at least one of said at least one protected thermocouples, the process comprising sensing a temperature of the skimmer using said at least one protected thermocouple positioned in the skimmer so as to be shielded from direct contact with molten material passing through the throat.

8. The process of claim 2 wherein the melter exit structure comprises a fluid-cooled panel configured to form a frozen or highly viscous material layer, or combination thereof, on an inner surface thereof facing the molten material, the melter exit structure including at least one of said at least one protected thermocouples, the process comprising sensing a temperature of the meter exit structure using said at least one protected thermocouple positioned in the melter exit structure so as to be shielded from direct contact with molten material passing through the melter exit structure.

9. A process comprising:
   a) feeding at least one partially or wholly vitrifiable material into a feed inlet of a melting zone of a melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in the melting zone, the inciter vessel comprising at least one fluid-cooled refractory panel in its floor, ceiling, and/or sidewall;
   b) heating the at least one partially or wholly vitrifiable material with at least one burner directing combustion products into the melting zone under a level of the molten material in the zone, one or more of the burners configured to impart turbulence to at least some of the molten material in the melting zone;
   c) discharging molten material from the melter vessel through the melter exit structure;
   d) cooling the at least one fluid-cooled refractory panel sufficiently to form a modified panel comprising a frozen or highly viscous material layer, or combination thereof, on at least a portion of a surface of the panel facing the molten material;
   e) sensing a temperature of the modified panel with one or more protected thermocouples positioned in the modified panel so as to be shielded from direct contact with turbulent molten material in the melting zone; and
   f) controlling at least one of steps (a)-(d) using the temperature of the modified panel to achieve a desired melt temperature of at least a portion of the turbulent molten material in the melting zone.

* * * * *

UNITED STATES PATENT AND TRADEMARK OFFICE
CERTIFICATE OF CORRECTION

PATENT NO. : 9,096,453 B2  Page 1 of 1
APPLICATION NO. : 13/493219
DATED : August 4, 2015
INVENTOR(S) : Mark William Charbonneau It is certified that error appears in the above-identified patent and that said Letters Patent is hereby corrected as shown below:

In the claims

Column 24, line 29, "meter" should read --melter--.

Signed and Sealed this
Twenty-second Day of December, 2015

Michelle K. Lee
*Director of the United States Patent and Trademark Office*